(12) United States Patent
Kim et al.

(10) Patent No.: US 11,914,389 B2
(45) Date of Patent: *Feb. 27, 2024

(54) AUTONOMOUS VEHICLE FOR HANDLING GOODS IN COOPERATION WITH UNMANNED AERIAL VEHICLE AND METHOD THEREOF

(71) Applicants: PABLO AIR Co., Ltd., Incheon (KR); PABLO AIR International, INC., Phoenix, AZ (US)

(72) Inventors: Youngjoon Kim, Incheon (KR); Seung Han Lim, Daejeon (KR)

(73) Assignees: PABLO AIR Co., Ltd., Incheon (KR); PABLO AIR International, INC., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,481

(22) Filed: Apr. 25, 2022

(65) Prior Publication Data

US 2022/0283589 A1 Sep. 8, 2022

Related U.S. Application Data

(63) Continuation of application No. 17/519,402, filed on Nov. 4, 2021, now Pat. No. 11,378,971.

(30) Foreign Application Priority Data

Mar. 4, 2021 (KR) .......................... 10-2021-0028672

(51) Int. Cl.
*G05D 1/02* (2020.01)
*B64C 39/02* (2023.01)
(Continued)

(52) U.S. Cl.
CPC .......... *G05D 1/0234* (2013.01); *B64C 39/024* (2013.01); *B64D 1/08* (2013.01);
(Continued)

(58) Field of Classification Search
USPC .......................................................... 701/24
See application file for complete search history.

(56) References Cited

U.S. PATENT DOCUMENTS 9,448,562 B1   9/2016  Sirang et al.
10,310,499 B1*  6/2019  Brady .................. G05D 1/0291
(Continued)

FOREIGN PATENT DOCUMENTS

CN      106351337 A    1/2017
JP      H11-124195 A   5/1999
(Continued)

OTHER PUBLICATIONS

Office Action mailed by the Korean Intellectual Property Office dated May 20, 2022, which corresponds to Korean Patent Application No. 10-2021-0139042 and is related to U.S. Appl. No. 17/728,481.
(Continued)

*Primary Examiner* — Tyler D Paige
(74) *Attorney, Agent, or Firm* — Studebaker & Brackett PC

(57) ABSTRACT

Provided is a method for an autonomous vehicle to handle goods in collaboration with an unmanned aerial vehicle. The method comprises recognizing an unmanned aerial vehicle loading goods by the autonomous vehicle, capturing an image of the recognized unmanned aerial vehicle by the autonomous vehicle, analyzing the captured image to recognize a marker by the autonomous vehicle, adjusting a relative position of the autonomous vehicle and the unmanned aerial vehicle by moving the autonomous vehicle based on a recognition result of the marker, and taking over
(Continued)

the goods from the unmanned aerial vehicle by the autonomous vehicle after position adjustment is completed.

11 Claims, 29 Drawing Sheets

(51) Int. Cl.
  *B64D 1/08* (2006.01)
  *G05D 1/10* (2006.01)
  *B64U 10/13* (2023.01)
  *G05D 1/00* (2006.01)
  *B64U 101/60* (2023.01)

(52) U.S. Cl.
  CPC ........... *G05D 1/0094* (2013.01); *G05D 1/101* (2013.01); *B64U 10/13* (2023.01); *B64U 2101/60* (2023.01)

(56) References Cited

U.S. PATENT DOCUMENTS

| | | | |
|---|---|---|---|
| 10,514,690 | B1* | 12/2019 | Siegel .............. G06Q 10/08355 |
| 2015/0370251 | A1* | 12/2015 | Siegel .................. G05D 1/0684 |
| | | | 701/2 |
| 2016/0012393 | A1* | 1/2016 | Wang ............... G06Q 10/08355 |
| | | | 705/338 |
| 2017/0072812 | A1 | 3/2017 | Von Novak et al. |
| 2017/0090484 | A1* | 3/2017 | Obaidi .................. B64C 39/024 |
| 2017/0219676 | A1* | 8/2017 | Tran ......................... H04K 3/62 |
| 2017/0300855 | A1 | 10/2017 | Lund et al. |
| 2018/0141453 | A1* | 5/2018 | High ........................ B60L 53/80 |
| 2018/0178667 | A1 | 6/2018 | Cumoli et al. |
| 2018/0356823 | A1 | 12/2018 | Cooper |
| 2018/0374033 | A1 | 12/2018 | Beecham |
| 2019/0025817 | A1 | 1/2019 | Mattingly et al. |
| 2019/0025818 | A1 | 1/2019 | Mattingly et al. |
| 2019/0025821 | A1* | 1/2019 | Salomon .............. G05D 1/0027 |
| 2019/0072979 | A1 | 3/2019 | Sukhomlinov et al. |
| 2019/0114549 | A1 | 4/2019 | Olsher |
| 2020/0036232 | A1 | 1/2020 | Jones et al. |
| 2020/0231392 | A1 | 7/2020 | Singh et al. |
| 2022/0283589 | A1* | 9/2022 | Kim ....................... G05D 1/101 |

FOREIGN PATENT DOCUMENTS

| | | |
|---|---|---|
| JP | 2012-071645 A | 4/2012 |
| JP | WO2017/022058 A1 | 7/2018 |
| JP | 2018-165205 A | 10/2018 |
| JP | 2020-034973 A | 3/2020 |
| JP | 6775091 B2 | 10/2020 |
| KR | 10-2015-0044046 A | 4/2015 |
| KR | 10-2015-0104863 A | 9/2015 |
| KR | 10-2017-0049516 A | 5/2017 |
| KR | 10-2017-0074369 A | 6/2017 |
| KR | 10-2018-0083569 A | 7/2018 |
| KR | 10-2019-0117421 A | 10/2019 |
| KR | 10-2019-0139169 A | 12/2019 |
| KR | 10-2020-0044691 A | 4/2020 |
| KR | 10-2020-0050572 A | 5/2020 |
| WO | 2019/071293 A1 | 4/2019 |

OTHER PUBLICATIONS

Notice of Allowance mailed by the Korean Intellectual Property Office dated May 20, 2022, which corresponds to Korean Patent Application No. 10-2021-0139044 and is related to U.S. Appl. No. 17/728,481.

Notice of Allowance mailed by the Korean Intellectual Property Office dated Oct. 12, 2022, which corresponds to Korean Patent Application No. 10-2022-0102295 and is related to U.S. Appl. No. 17/728,481.

* cited by examiner

AUTONOMOUS VEHICLE FOR HANDLING GOODS IN COOPERATION WITH UNMANNED AERIAL VEHICLE AND METHOD THEREOF

CROSS-REFERENCE TO RELATED APPLICATIONS

This application is a Continuation of U.S. patent application Ser. No. 17/519,402 filed Nov. 4, 2021, which claims the benefit of Korean Patent Application No. 10-2021-0028672, filed on Mar. 4, 2021, in the Korean Intellectual Property Office, the disclosure of which is incorporated herein by reference in its entirety.

BACKGROUND

1. Field

The present disclosure relates to an autonomous vehicle for handling goods in collaboration with an unmanned aerial vehicle and method therefor. In more detail, it relates to an autonomous vehicle that takes over and handles delivery target goods in collaboration with an unmanned aerial vehicle for delivery and a method therefor.

2. Description of the Related Art

Today, unmanned aerial vehicles such as drones are being used in various fields. For example, unmanned aerial vehicles are being used in the broadcasting field, agriculture field, military field, and the like.

Furthermore, technology for delivering goods using unmanned aerial vehicles is also currently being developed. For example, research is being conducted on a service, in which an unmanned aerial vehicle delivers goods to a designated place in a state of gripping the goods. Using such an unmanned aerial vehicle for delivery not only saves labor costs, but also enables rapid delivery of goods to areas where vehicles are difficult to move, such as mountainous areas and islands.

However, in the case of delivering goods through an unmanned aerial vehicle, there is a need for the goods to be accurately unloaded at a designated position. For example, the unmanned aerial vehicle should accurately unload the goods into a goods storage box for storing goods. If the goods are not accurately unloaded into the goods storage box and the goods are unloaded around the goods storage box, the reliability of the delivery of the goods is lowered, and the goods may be lost or damaged due to rain and wind, and external factors.

SUMMARY

The technical problem to be solved by the present disclosure is to provide an autonomous vehicle, which accurately unloads the goods at the loading place by adjusting the relative position with an unmanned aerial vehicle through the movement of the autonomous vehicle when taking over the goods from the unmanned aerial vehicle, and a method therefor.

Another technical problem to be solved by the present disclosure is to provide an autonomous vehicle, which analyzes sensing data such as an optical signal, an image and distance measurement data to precisely adjust a position when goods are taken over, and a method therefor.

Another technical problem to be solved by the present disclosure is to provide an autonomous vehicle capable of safely taking over goods from an unmanned aerial vehicle without damaging the goods.

The technical problems of the present disclosure are not limited to the technical problems mentioned above, and other technical problems not mentioned will be clearly understood by those skilled in the art from the following description.

According to an embodiment, a method for an autonomous vehicle to handle goods in collaboration with an unmanned aerial vehicle may include, recognizing an unmanned aerial vehicle loading goods by the autonomous vehicle, capturing an image of the recognized unmanned aerial vehicle by the autonomous vehicle, analyzing the captured image to recognize a marker by the autonomous vehicle, adjusting a relative position of the autonomous vehicle and the unmanned aerial vehicle by moving the autonomous vehicle based on a recognition result of the marker, and taking over the goods from the unmanned aerial vehicle by the autonomous vehicle after position adjustment is completed.

According to an embodiment, wherein the autonomous vehicle may include a goods loading unit provided with a space, in which the goods are taken over and seated, and a goods protecting unit coupled to the goods loading unit and including a plurality of folding poles, wherein taking over the goods from the unmanned aerial vehicle by the autonomous vehicle may include controlling the plurality of folding poles to unfold outward (i.e., from inside to outside) by the autonomous vehicle when the position adjustment is completed.

According to an embodiment, wherein the autonomous vehicle may include a goods loading unit provided with a space, in which the goods are taken over and seated, and an air mat and a pump coupled to an upper portion of the goods loading unit, wherein taking over the goods from the unmanned aerial vehicle may include, injecting air into the air mat by driving the pump when the position adjustment is completed, and transmitting an unloading request signal to the unmanned aerial vehicle when air injection is completed.

According to an embodiment, wherein the autonomous vehicle may include a goods loading unit provided with a space, in which the goods are taken over and seated, a lifting unit for raising or lowering the goods loading unit, and a distance measuring sensor for measuring a distance with the goods or the unmanned aerial vehicle, wherein taking over the goods from the unmanned aerial vehicle may include, continuously raising the goods loading unit using the lifting unit to take over the goods when the position adjustment is completed, and stopping raising of the goods loading unit when a distance measured by the distance measuring sensor is included in an unloading range, and transmitting an unloading request signal to the unmanned aerial vehicle when raising of the goods loading unit is stopped.

According to an embodiment, the method further may include, measuring distances to a plurality of spots located on the unmanned aerial vehicle by the autonomous vehicle, wherein adjusting the relative position may include adjusting a relative position with the unmanned aerial vehicle by moving the autonomous vehicle when a deviation of the measured distance is out of a preset error range, and completing position adjustment when the deviation is within the error range.

According to an embodiment, the method further may include, detecting one or more optical signals emitted in a downward direction from one or more spots of the unmanned aerial vehicle by the autonomous vehicle, wherein adjusting the relative position may include, adjusting a relative position with the unmanned aerial vehicle by moving the autonomous vehicle when less than the preset number of signals from among the one or more optical signals are detected, and completing position adjustment when more than the preset number of signals from among the one or more optical signals are detected.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

Hereinafter, some embodiments of the present disclosure will be described in detail with reference to the accompanying drawings.

Figure 1:
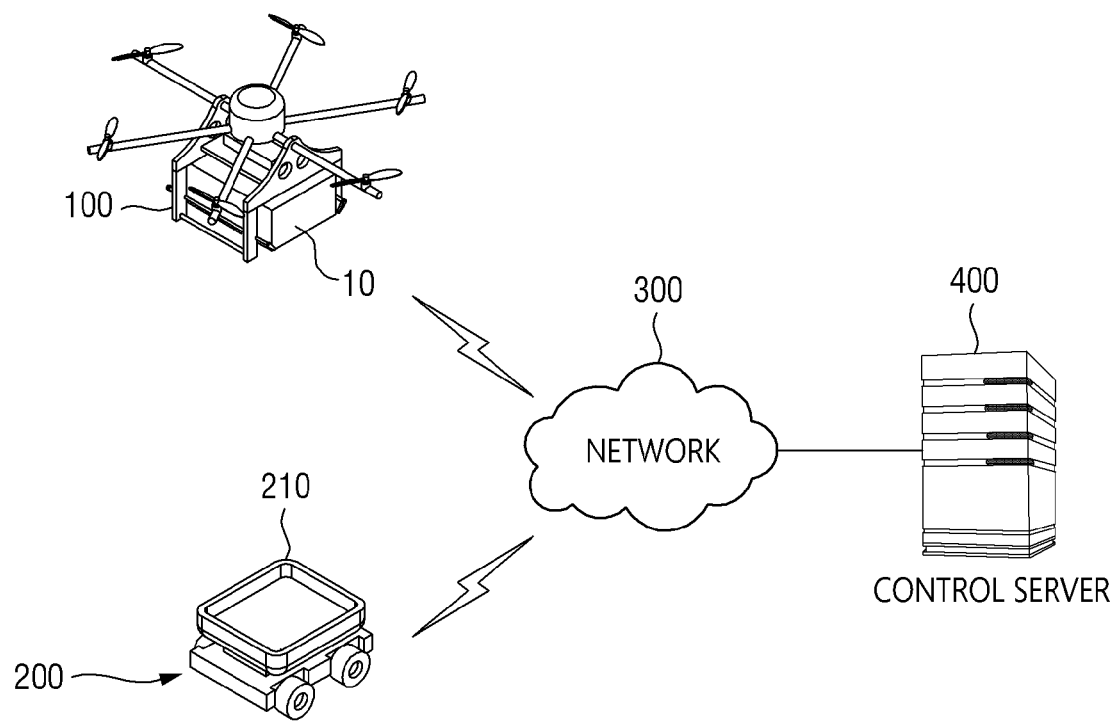
FIG. 1 is a diagram showing the configuration of a delivery system according to an embodiment of the present disclosure.

FIG. 1 is a diagram showing the configuration of a delivery system according to an embodiment of the present disclosure.

As shown in FIG. 1, the delivery system according to an embodiment of the present disclosure may include an unmanned aerial vehicle 100, an autonomous vehicle 200, and a control server 400, and each of these components may communicate with each other via the network 300. The network 300 includes a mobile communication network and a wired communication network, and may support communication between the unmanned aerial vehicle 100 or the autonomous vehicle 200 and the control server 400.

The control server 400 is a server that controls the unmanned aerial vehicle 100 delivering goods 10, and may provide delivery information including an unloading place, and delivery destination information to the unmanned aerial vehicle 100. Also, the control server 400 may provide the delivery information to the autonomous vehicle 200. The control server 400 may receive the position information from the unmanned aerial vehicle 100 or the autonomous vehicle 200, and monitor whether the unmanned aerial vehicle 100 or the autonomous vehicle 200 is moving to a designated position. In addition, the control server 400 may designate an autonomous vehicle 200 for unloading goods of the unmanned aerial vehicle 100. That is, the control server 400 may select the autonomous vehicle 200 for taking over the goods 10 of the unmanned aerial vehicle 100 from among multiple autonomous vehicles, and provide the delivery information to the selected autonomous vehicle 200.

Figure 2:
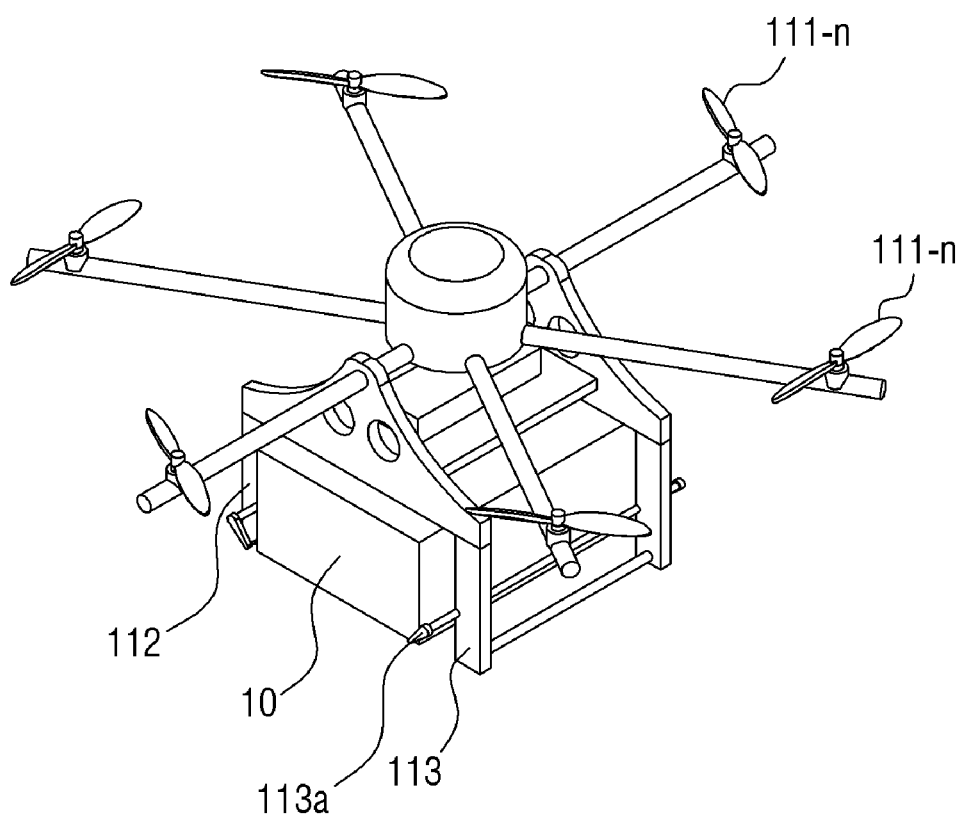
FIG. 2 is a perspective view of an unmanned aerial vehicle referenced in some embodiments of the present disclosure.
Figure 3:
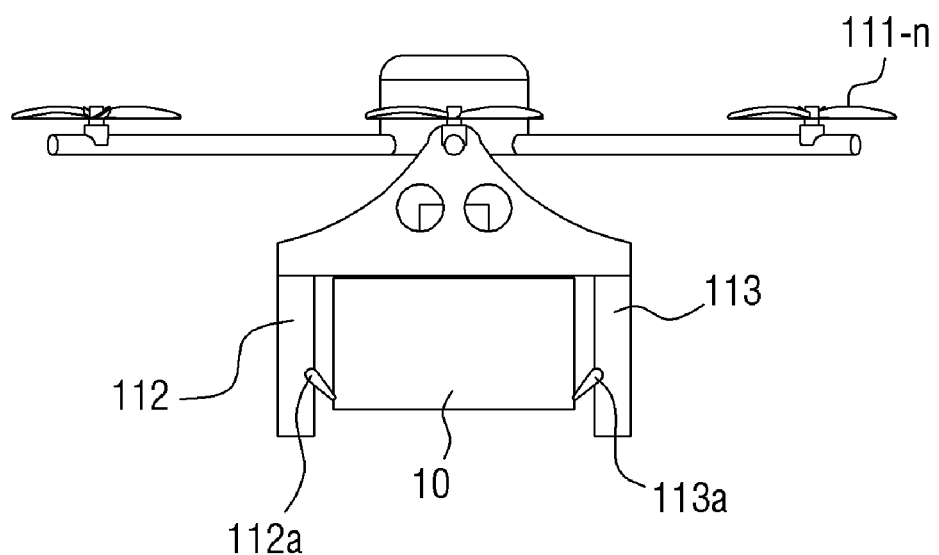
FIG. 3 is a front view of an unmanned aerial vehicle referenced in some embodiments of the present disclosure.
Figure 4:
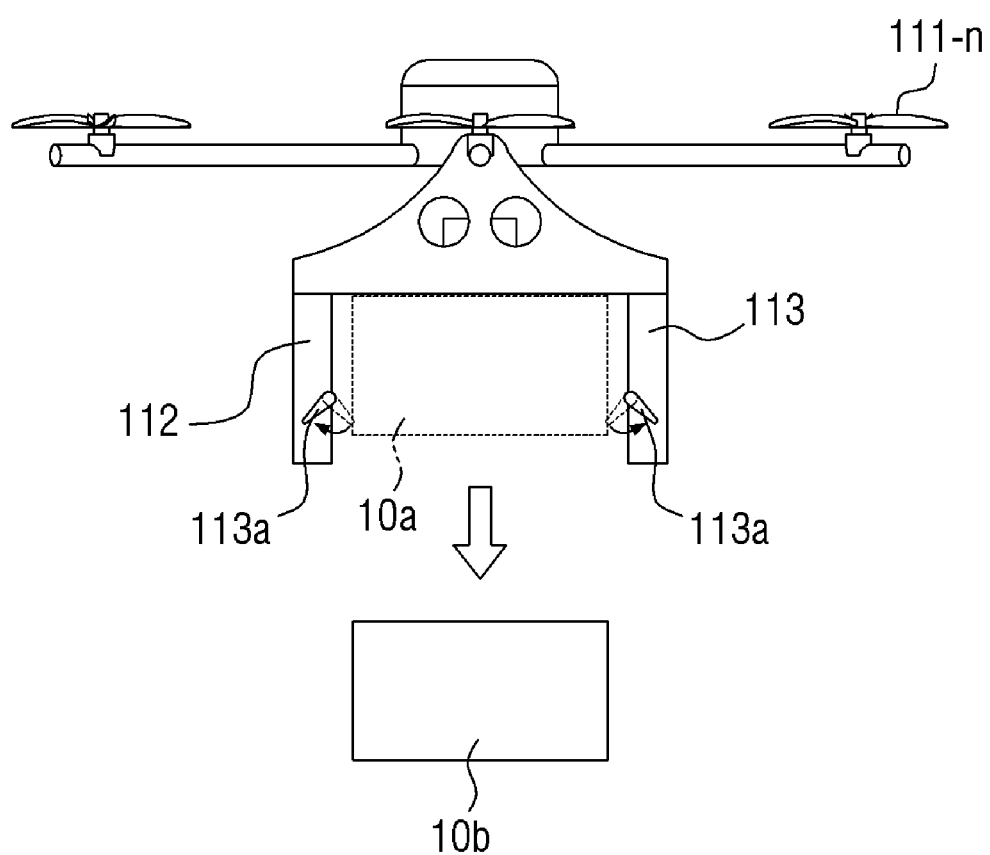
FIG. 4 is a view illustrating a state, in which the unmanned aerial vehicle of FIG. 3 releases the gripping of the goods.

The unmanned aerial vehicle 100 is a flying device that delivers the goods 10 to a designated unloading place, has one or more thrust generating means such as a propeller, and may fly in the air using the thrust generating means. The unmanned aerial vehicle 100 may autonomously fly to an unloading place, and may land or fly in place when arriving at the unloading place. The unmanned aerial vehicle 100 is provided with gripping members 112 and 113 capable of gripping the goods 10 as shown in FIGS. 2 to 4, and may operate to the unloading place while gripping the goods 10 using the gripping members 112 and 113. In the present embodiment, the gripping members 112 and 113 may also serve as a landing gear when landing. That is, the gripping members 112 and 113 may perform a function of a landing gear to protect the aerial vehicle when the unmanned aerial vehicle 100 lands. When the unmanned aerial vehicle 100 moves to an unloading place, the goods 10 may be unloaded into a goods loading unit 210 included in the autonomous vehicle 200. In an embodiment, when the unmanned aerial vehicle 100 receives the unloading request signal from the autonomous vehicle 200, it may release the gripping state of the goods 10 to unload the goods 10 into the goods loading units 210 of the autonomous vehicle 200. As the autonomous flight method of the unmanned aerial vehicle 100, a known technology may be used.

The autonomous vehicle 200 is a device that autonomously moves to a designated delivery destination using a driving means such as wheels and legs, and may include an autonomous driving vehicle, an autonomous driving robot, and the like. The autonomous vehicle 200 includes a goods loading unit 210, in which the goods 10 is unloaded. The autonomous vehicle 200 may perform short-range wireless communication with the unmanned aerial vehicle 100.

According to this embodiment, after recognizing the unmanned aerial vehicle 100 that is performing landing or flying in place, the autonomous vehicle 200 may acquire the position of the unmanned aerial vehicle 100, and then autonomously drive to the position under the unmanned aerial vehicle 100 in order to take over the goods 10. When the unmanned aerial vehicle 100 is in a landed state, the autonomous vehicle 200 may request vertical movement to the unmanned aerial vehicle 100 through short-range wireless communication and then move in the downward direction of the unmanned aerial vehicle 100. When the movement to the destination is completed, the autonomous vehicle 200 may collect sensing data indicating a relative position with the unmanned aerial vehicle 100 and adjust the relative position with the unmanned aerial vehicle 100 by moving based on the sensing data. The autonomous vehicle 200 may perform position adjustment through various embodiments to be described later. When the position adjustment is completed, the autonomous vehicle 200 transmits an unloading signal to the unmanned aerial vehicle 100 and takes over the goods 10 from the unmanned aerial vehicle 100.

According to this embodiment, the unloading position alignment of the unmanned aerial vehicle 100 and the autonomous vehicle 200 is performed based on the sensing data, so that an effect of accurately and safely unloading the goods 10 into the goods loading unit 210 is yielded.

Hereinafter, the configuration and operation of the unmanned aerial vehicle 100 applied to some embodiments of the present disclosure will be described.

FIG. 2 is a perspective view of an unmanned aerial vehicle referenced in some embodiments of the present disclosure.

FIG. 3 is a front view of an unmanned aerial vehicle referenced in some embodiments of the present disclosure.

FIG. 4 is a view illustrating a state, in which the unmanned aerial vehicle of FIG. 3 releases the gripping of the goods.

Referring to FIGS. 2 to 4, the unmanned aerial vehicle 100 referenced in some embodiments of the present disclosure includes a plurality of propellers 111-n as a means for generating thrust, and a gripping member 112, 113 for gripping goods.

The plurality of propellers 111-n are rotated according to the control to levitate the unmanned aerial vehicle 100 in the air.

The gripping members 112, 113 grip the goods 10. As shown in FIGS. 2 to 4, the gripping members 112 and 113 are symmetrically formed on both sides, and an internal space capable of accommodating the goods 10 may be provided therein. In addition, the gripping members 112 and 113 may include pressing members 112a and 113a for gripping the goods 10 by pressing the goods 10 with the constant force on the inner surface thereof. The pressing members 112a and 113a may have a predetermined length, as shown in FIG. 2.

The pressing members 112a and 113a press the goods 10 toward the inner surface when gripping the goods, and when releasing the gripping of goods 10 and unloading them, they move to the outer surface to release the pressing force applied in the direction of the goods 10. As illustrated in FIG. 4, when the pressing members 112a and 113a move to the outer surface, the gripping state of the goods 10a is released, so that the goods 10b falls in a downward direction.

Figure 5:
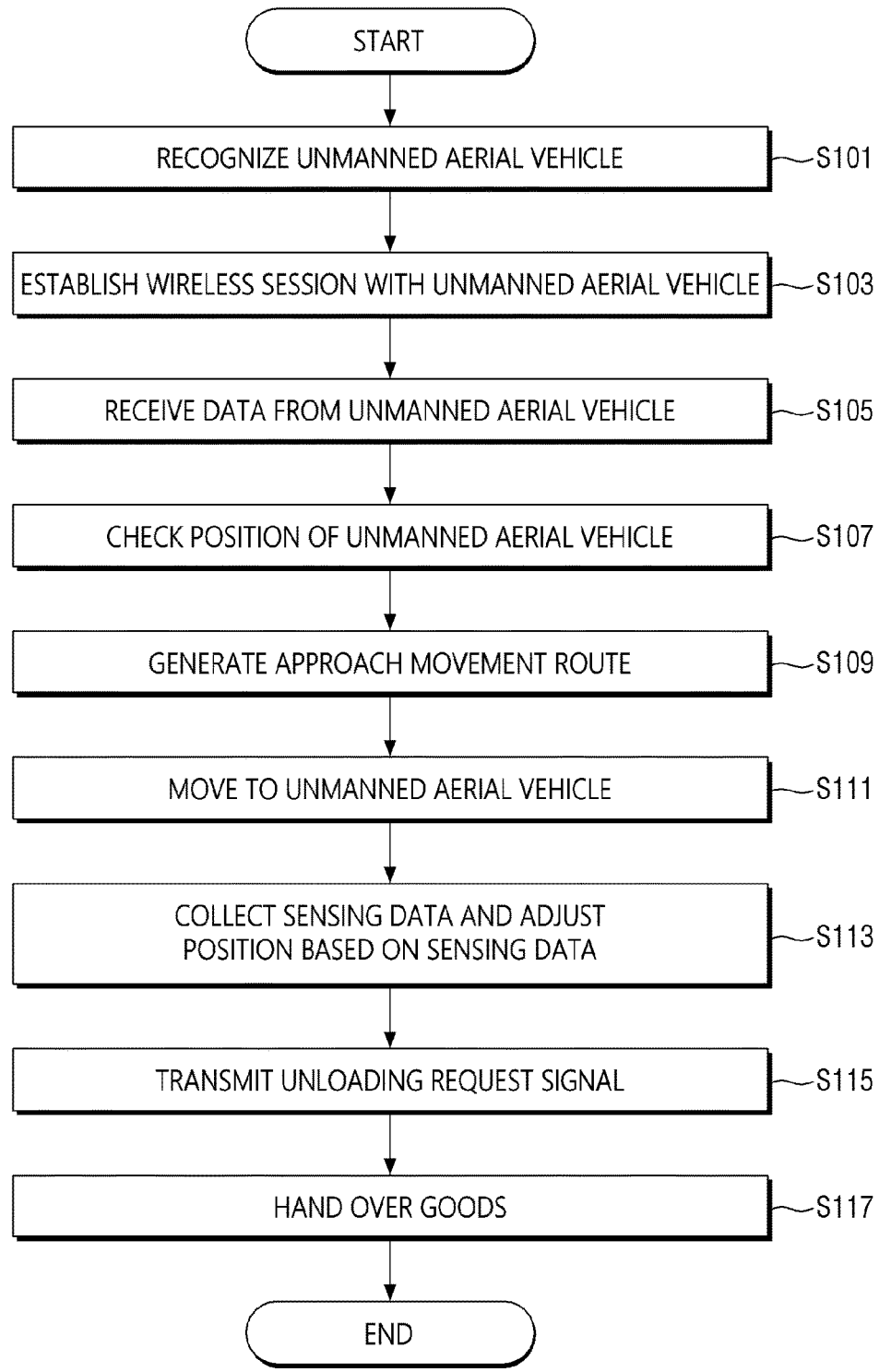
FIG. 5 is a flowchart illustrating a method for an autonomous vehicle to handle a delivery target goods in collaboration with an unmanned aerial vehicle according to another embodiment of the present disclosure.

FIG. 5 is a flowchart illustrating a method for an autonomous driving device to handle delivery target goods in collaboration with and an unmanned aerial vehicle according to another embodiment of the present disclosure.

Referring to FIG. 5, the autonomous vehicle 200 may identify an unloading position in the delivery information received from the control server 400, autonomously drive to the unloading position, and then recognize an unmanned aerial vehicle 100 for taking over goods 10 around the unloading position (S101). In one embodiment, the autonomous vehicle 200 receives and stores identification information of the unmanned aerial vehicle 100 for unloading the goods from the control server 400 in advance, and may determine that the unmanned aerial vehicle 100 for taking over the goods 10 is recognized when the identification information detected through short-range wireless communication matches the identification information of the unmanned aerial vehicle 100 that is being stored. As another embodiment, the autonomous vehicle 200 may capture the surroundings using a camera, and analyze the captured image to recognize the unmanned aerial vehicle 100 existing in the vicinity.

Subsequently, the autonomous vehicle 200 may establish a short-range wireless session with the recognized unmanned aerial vehicle 100 (S103). Next, the autonomous vehicle 200 may receive various data necessary for goods delivery and unloading from the unmanned aerial vehicle 100, with which the short-range wireless session is established (S105). For example, the autonomous vehicle 200 may receive delivery data for delivering the goods 10 from the unmanned aerial vehicle 100, and may also receive one or more of position data (e.g., GNSS coordinates) and altitude data of the unmanned aerial vehicle 100, and posture data of the unmanned aerial vehicle 100 from the unmanned aerial vehicle 100. The posture data may include data indicating whether the unmanned aerial vehicle 100 is landing, and yaw, roll, and pitch of the unmanned aerial vehicle 100.

Figure 21:
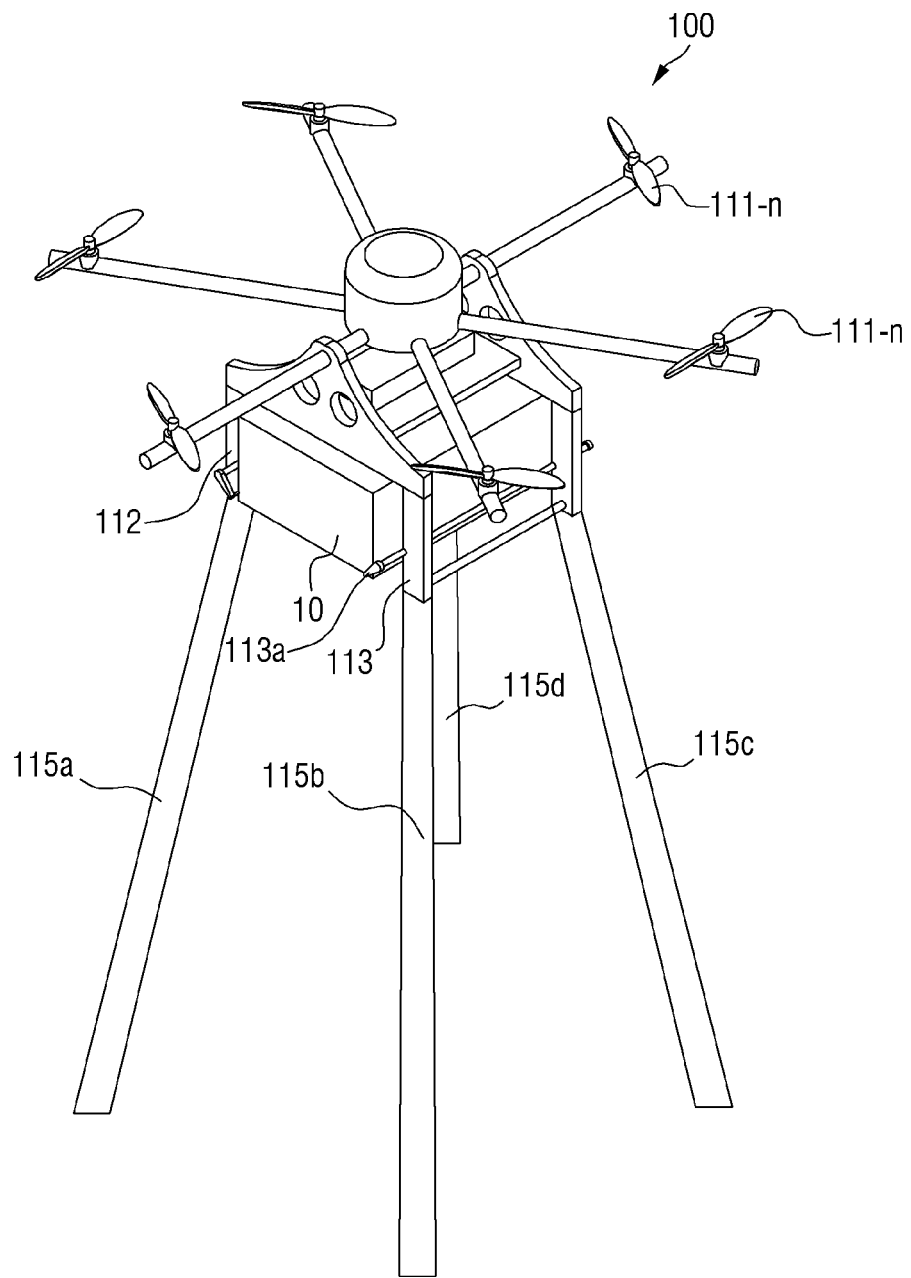
FIG. 21 is a diagram illustrating an unmanned aerial vehicle that may be referred to in some embodiments of the present disclosure.

Subsequently, the autonomous vehicle 200 may identify the position of the unmanned aerial vehicle 100 based on the data received from the unmanned aerial vehicle 100 (S107). In some embodiments, the autonomous vehicle 200 may determine whether the unmanned aerial vehicle 100 is landing based on the received data, and if it is landing, the autonomous vehicle 100 may transmit a message requesting to perform flight in place at a current position (i.e., landing position) to the unmanned aerial vehicle 100 so that it is possible to control the unmanned aerial vehicle 100 to fly in place at a constant height from the landing position. In addition, as illustrated in FIG. 21, when the unmanned aerial vehicle 100 is provided with a plurality of landing gears 115a to 115d exceeding the height of the autonomous vehicle 200, the autonomous vehicle 200 may perform subsequent steps in a state, in which the unmanned aerial vehicle 100 lands on the ground, without requesting the unmanned aerial vehicle 100 to perform flight in place.

Next, the autonomous vehicle 200 may generate an approach movement route for moving from the current position to the position of the unmanned aerial vehicle 100 based on its current position and the position of the unmanned aerial vehicle 100 (S109). The approach movement route may include GNSS coordinates that should be sequentially passed from the position of the autonomous vehicle 200 to the position of the unmanned aerial vehicle 100.

Figure 6:
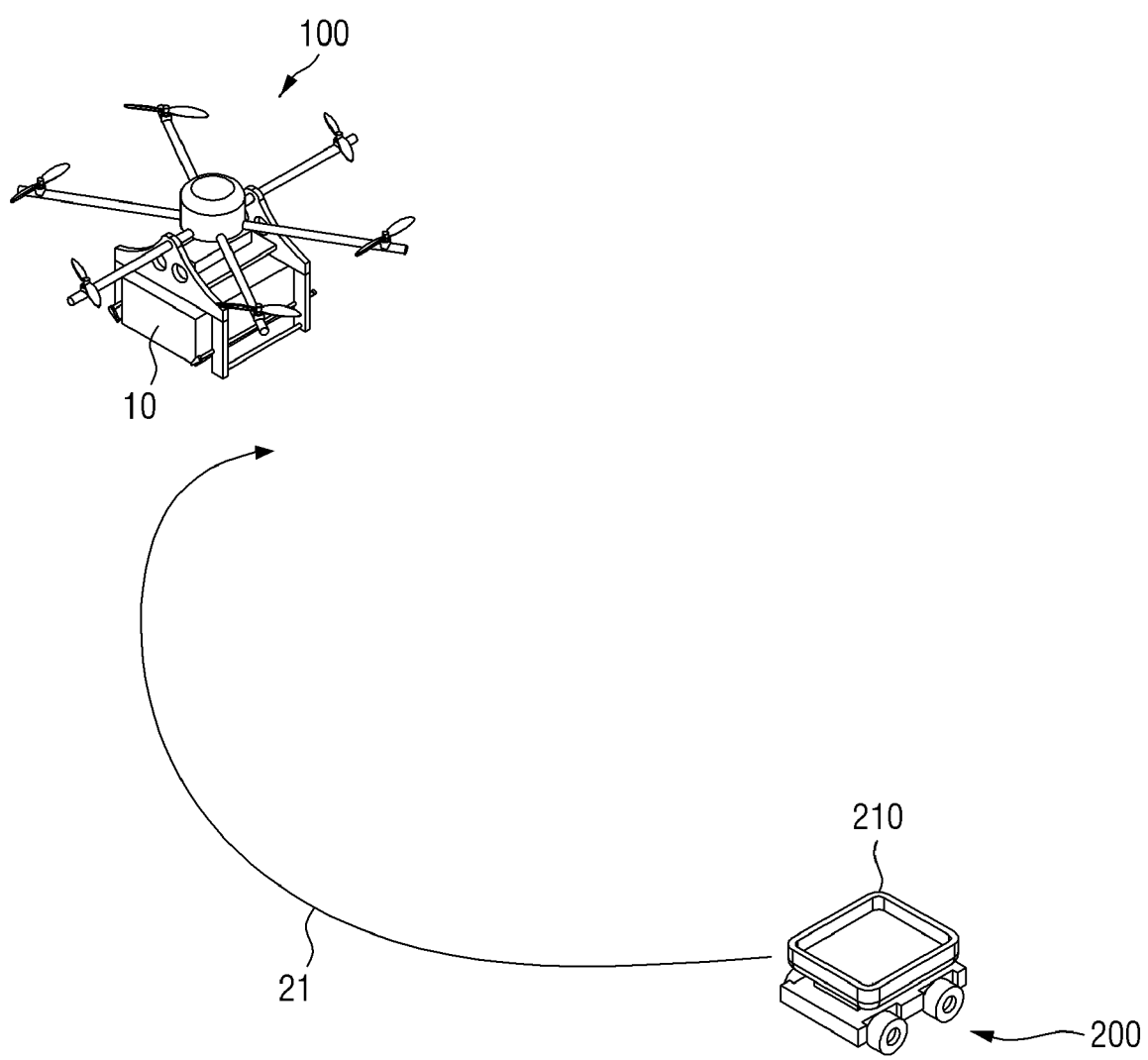
FIG. 6 is a diagram illustrating an approach movement route of an autonomous vehicle.

FIG. 6 is a diagram illustrating an approach movement route of an autonomous vehicle. As illustrated in FIG. 6, the autonomous vehicle 200 may generate the approach movement route 21 that can approach from the current position to the position of the unmanned aerial vehicle 100.

Figure 22:
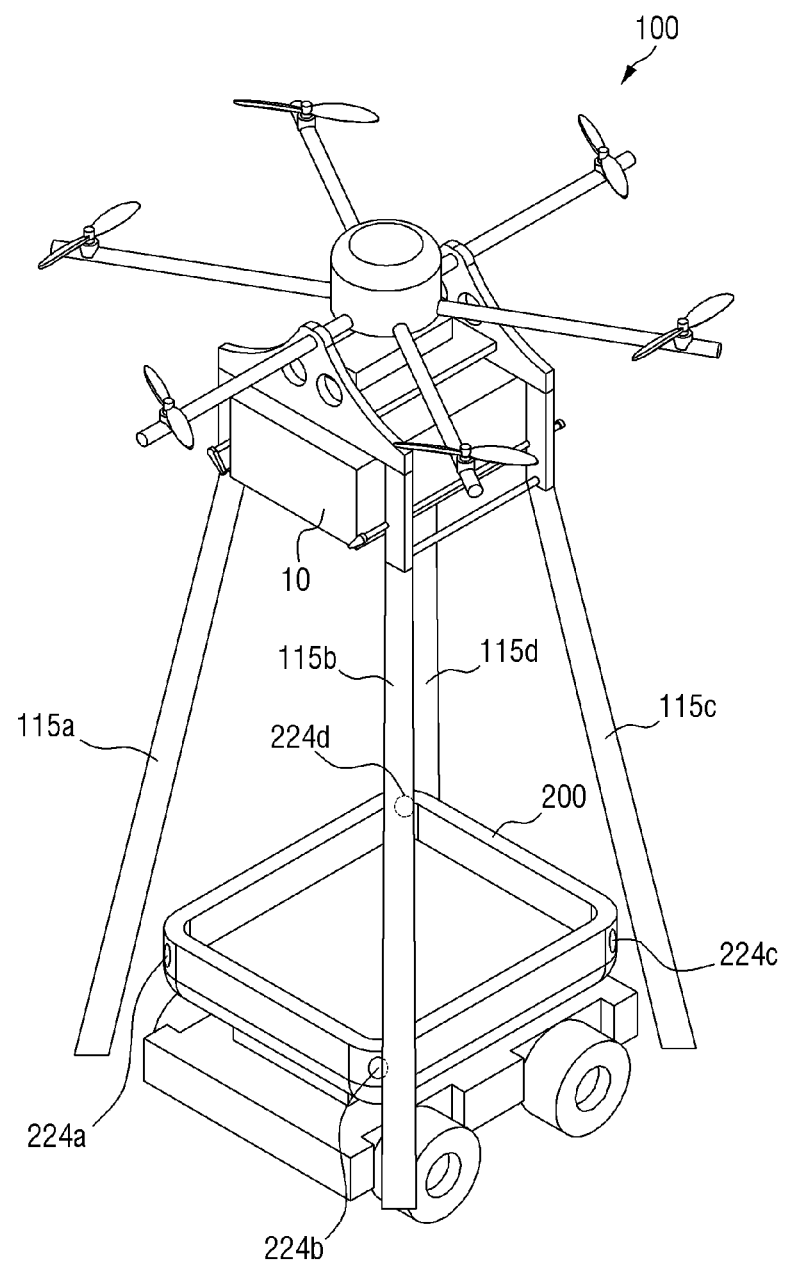
FIG. 22 is a diagram illustrating a position adjustment state of an autonomous vehicle, which may be referred to in some embodiments of the present disclosure.

Then, the autonomous vehicle 200 may autonomously drive to the position of the unmanned aerial vehicle 100 based on the approach movement route and move to the position of the unmanned aerial vehicle 100 (S111). When the autonomous vehicle 200 completes the movement to the position of the unmanned aerial vehicle 100, the unmanned aerial vehicle 100 may fly in place in the air above the autonomous vehicle 200. Alternatively, the unmanned aerial vehicle 100 may maintain the landing state, as illustrated in FIG. 22.

Next, the autonomous vehicle 200 may obtain sensor data that indicates a relative position with the unmanned aerial vehicle 100 and is the basis of position alignment, and move based on the sensor data to adjust the relative position with the unmanned aerial vehicle 100 (S113). In various embodiments described below, an image, distance measurement data, or optical signal may be detected and used as sensor data by the autonomous vehicle 200. The autonomous vehicle 200 may determine whether the relative position with the unmanned aerial vehicle 100 is suitable for unloading goods by analyzing the sensor data. The autonomous vehicle 200 may perform position adjustment until it becomes a suitable state (i.e., an alignment state) for unloading goods.

When the position adjustment is completed, the autonomous vehicle 200 may transmit an unloading request signal to the unmanned aerial vehicle 100 using short-range wireless communication (S115). Then, the unmanned aerial vehicle 100 releases the gripping state of the goods 10 and unloads the goods 10 into the goods loading unit 210 of the autonomous vehicle 200, and the autonomous vehicle 200 may take over the goods 10 (S117). At this time, the unmanned aerial vehicle 100 may release the gripping state of the goods 10 at the current position to drop the goods 10 into the autonomous vehicle 200 in the air. Alternatively, the unmanned aerial vehicle 100 may descend by a predetermined height to narrow the gap with the autonomous driving mobile 200 or release the gripping state of the goods 10 after landing on the upper surface of the loading unit 210 of the autonomous vehicle 200. Upon taking over the goods 10, the autonomous vehicle 200 may autonomously drive to a delivery destination and deliver the goods 10 to a recipient.

According to this embodiment, the autonomous vehicle 200 may safely take over the goods 10 from the unmanned aerial vehicle 100 by performing the unloading position alignment based on the sensing data.

Hereinafter, various embodiments of a method of adjusting a position using sensing data (S113) will be described in detail with reference to FIGS. 7 to 22.

Figure 7:
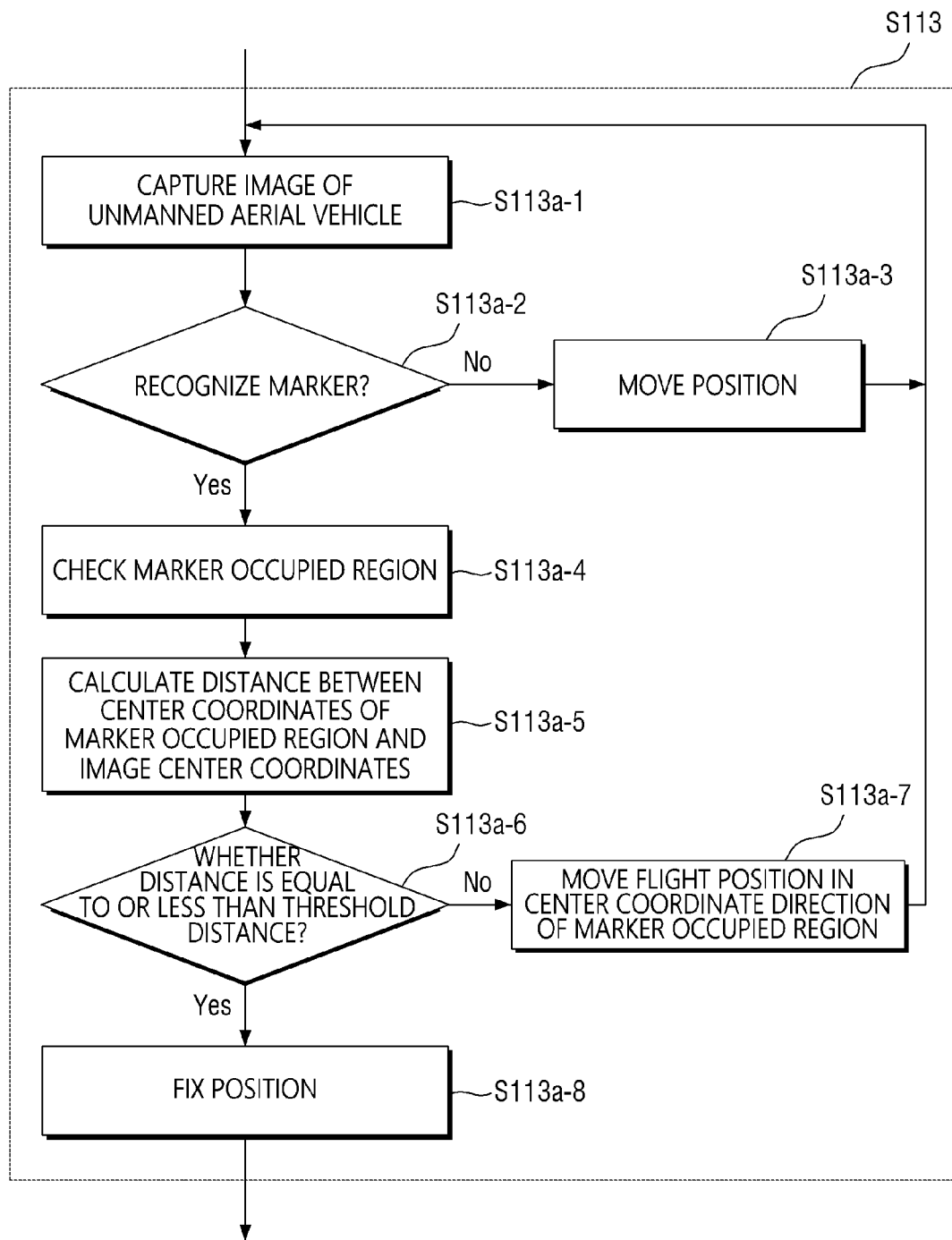
FIG. 7 is a flowchart illustrating a method of adjusting a position using sensing data according to an embodiment of the present disclosure.

FIG. 7 is a flowchart illustrating a method of adjusting a position using sensing data according to an embodiment of the present disclosure.

Figure 8:
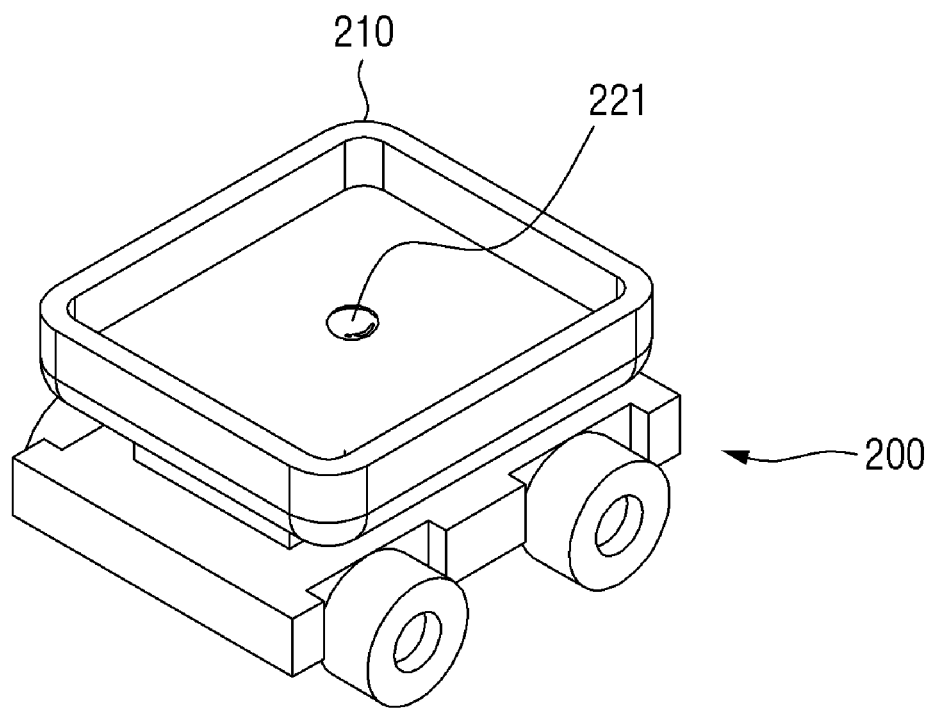
FIG. 8 is a perspective view of an autonomous driving device equipped with a camera according to an embodiment of the present disclosure.

FIG. 8 is a perspective view of an autonomous driving device equipped with a camera according to an embodiment of the present disclosure.

Figure 9:
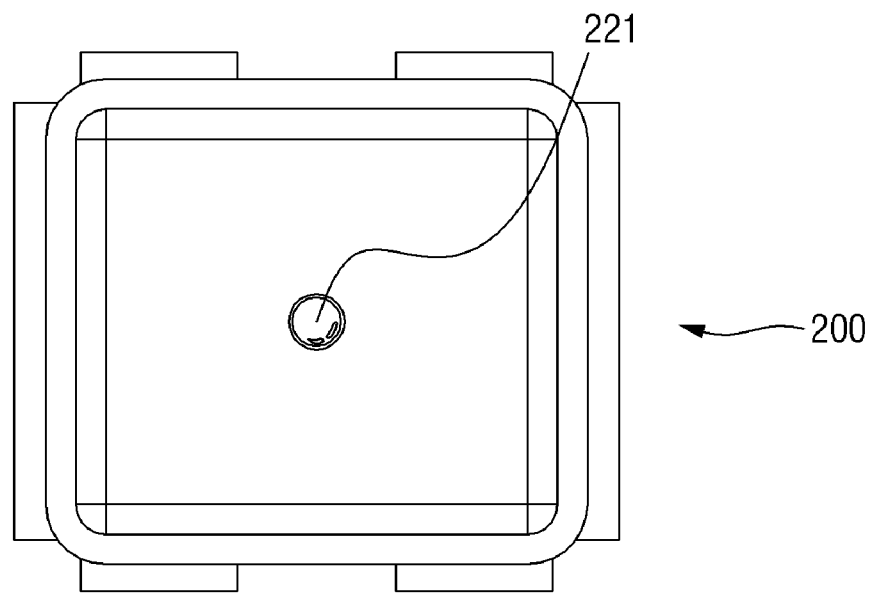
FIG. 9 is a plan view of an autonomous driving device equipped with a camera according to an embodiment of the present disclosure.

FIG. 9 is a plan view of an autonomous driving device equipped with a camera according to an embodiment of the present disclosure.

Figure 10:
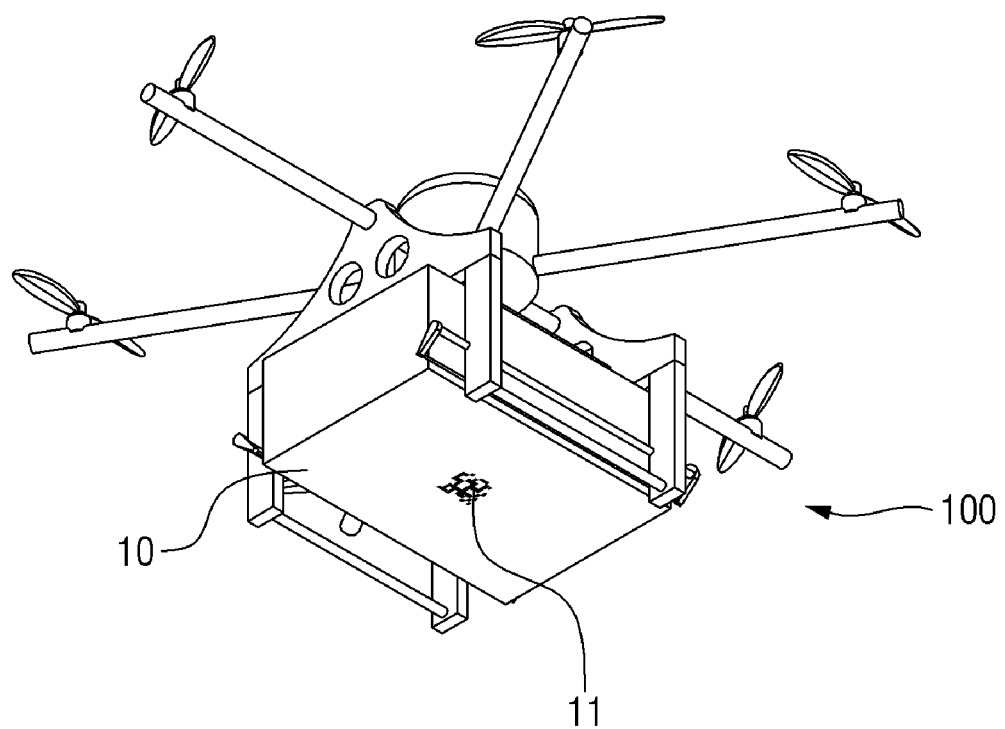
FIG. 10 is a diagram illustrating goods that can be used in an embodiment of the present disclosure.

FIG. 10 is a diagram illustrating goods that can be used in an embodiment of the present disclosure.

Figure 11:
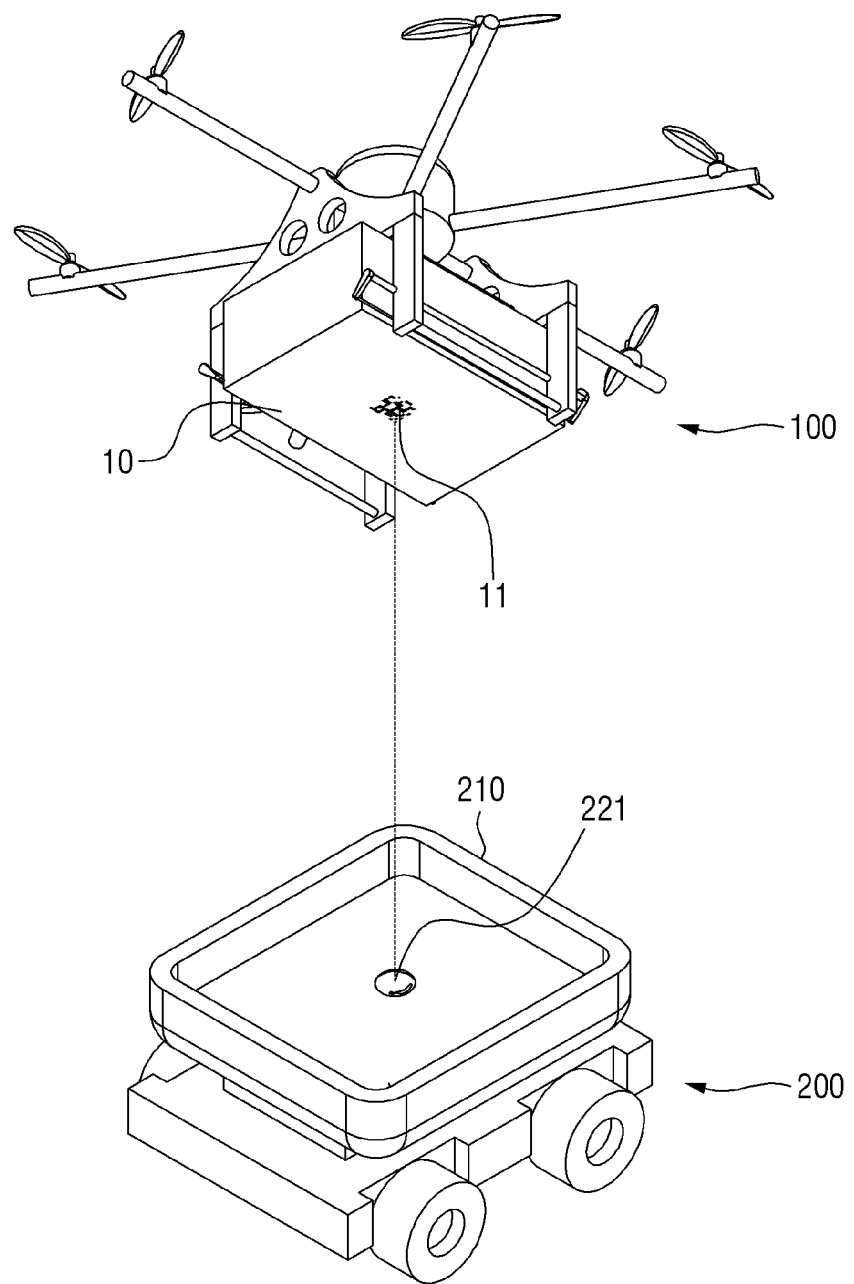
FIG. 11 is a diagram illustrating an autonomous driving device and an unmanned aerial vehicle aligned according to the method of FIG. 7.

FIG. 11 is a diagram illustrating an autonomous driving device and an unmanned aerial vehicle aligned according to the method of FIG. 7.

Referring to FIGS. 7 to 11, when the movement to the position of the unmanned aerial vehicle 100 is completed, the autonomous vehicle 200 may capture an image of the unmanned aerial vehicle 100 that is flying in place in the air or landing (S113a-1). The camera 221 for capturing the unmanned aerial vehicle 100 may be arranged in an upper portion of the autonomous vehicle 200 to capture the lower surface of the unmanned aerial vehicle 100. In FIGS. 8 and 9, the camera 221 is exemplified as being arranged on the upper surface of the loading unit 210.

As illustrated in FIG. 10, for aligning the unloading position, a marker 11 may be printed in the center of the lower surface of the goods 10, and accordingly, the camera 221 may be arranged in the center of the upper surface of the goods loading unit 210. The marker 11 may be a two-dimensional barcode as a promised image. In a state, in which the center point of the goods 10 gripped by the unmanned aerial vehicle 100 and the center point of the bottom surface of the goods loading unit 210 coincide vertically, at least one of a position of the camera 221, a capturing angle, and a position of the marker 11 may be adjusted so that the center coordinates of the entire image captured by the camera 221 and the center coordinates of the region occupied by the marker 11 in the image coincide with each other.

Then, the autonomous vehicle 200 may analyze the captured image to determine whether the marker 11 is recognized (S113a-2). If the marker is not recognized, the autonomous vehicle 200 may move its position (S113a-3). In this case, the autonomous driving moving mobile object 200 may move in forward/backward/left/right directions by a predetermined distance. When the movement is completed, the autonomous vehicle 200 may capture an image of the unmanned aerial vehicle 100 again using the camera 221.

On the other hand, when the marker is recognized in the captured image, the autonomous vehicle 200 may identify the region occupied by the marker 11 on the entire captured image (S113a-4). Next, the autonomous vehicle 200 calculates a distance between the center coordinates of the identified marker occupied region and the center coordinates of the image (S113a-5). Next, the autonomous vehicle 200 may determine whether the calculated distance is less than or equal to a preset threshold distance (S113a-6). If the calculated distance exceeds the threshold distance, the relative position with the unmanned aerial vehicle 100 may be adjusted by moving in the center coordinate direction of the marker occupied region (S113a-7). In addition, the autonomous vehicle 200 may capture again the image of the unmanned aerial vehicle 100 at the moved position.

On the other hand, if the calculated distance is equal to or less than the threshold distance, the autonomous vehicle 200 may determine that the position adjustment is completed, and may fix the current position as a position to take over the goods 10 (S113a-8). As illustrated in FIG. 11, when the center point of the marker 11 and the center point of the camera 221 are formed to be less than or equal to a threshold distance on the basis of the vertical axis, the position adjustment for unloading goods may be completed.

In the above description, although the embodiment of adjusting the relative position with the unmanned aerial vehicle 100 based on the distance between the center coordinates of the region occupied by the marker 11 in the image captured by the autonomous vehicle 200 and the center coordinates of the image has been described, the present disclosure is not limited to the embodiment. For example, the marker may be located at a predetermined specific point, such as an arbitrary edge or vertex in the captured image. In this case, the autonomous vehicle 2000 may adjust the relative position with the unmanned aerial vehicle 100 based on the marker at the specific position. In other words, the marker 11 may be located at an edge, a vertex, etc. other than the center of the lower surface of the goods, or may be located at a specific point on the lower surface of the unmanned aerial vehicle 100, and the autonomous vehicle 200 may adjust the relative position with the aerial vehicle 100 based on the marker of the specific position. In addition, there may be a plurality of markers 11, and the autonomous vehicle 200 may adjust a relative position with the aerial vehicle 100 based on the plurality of marker positions recognized through image capturing.

According to the present embodiment, position alignment between the autonomous vehicle 200 and the unmanned aerial vehicle 100 for unloading goods can be accurately performed based on the marker position recognized through image capturing, so that a situation, in which the goods 10 are separated from the designated loading space at the time of unloading the goods 10, can be prevented.

Figure 12:
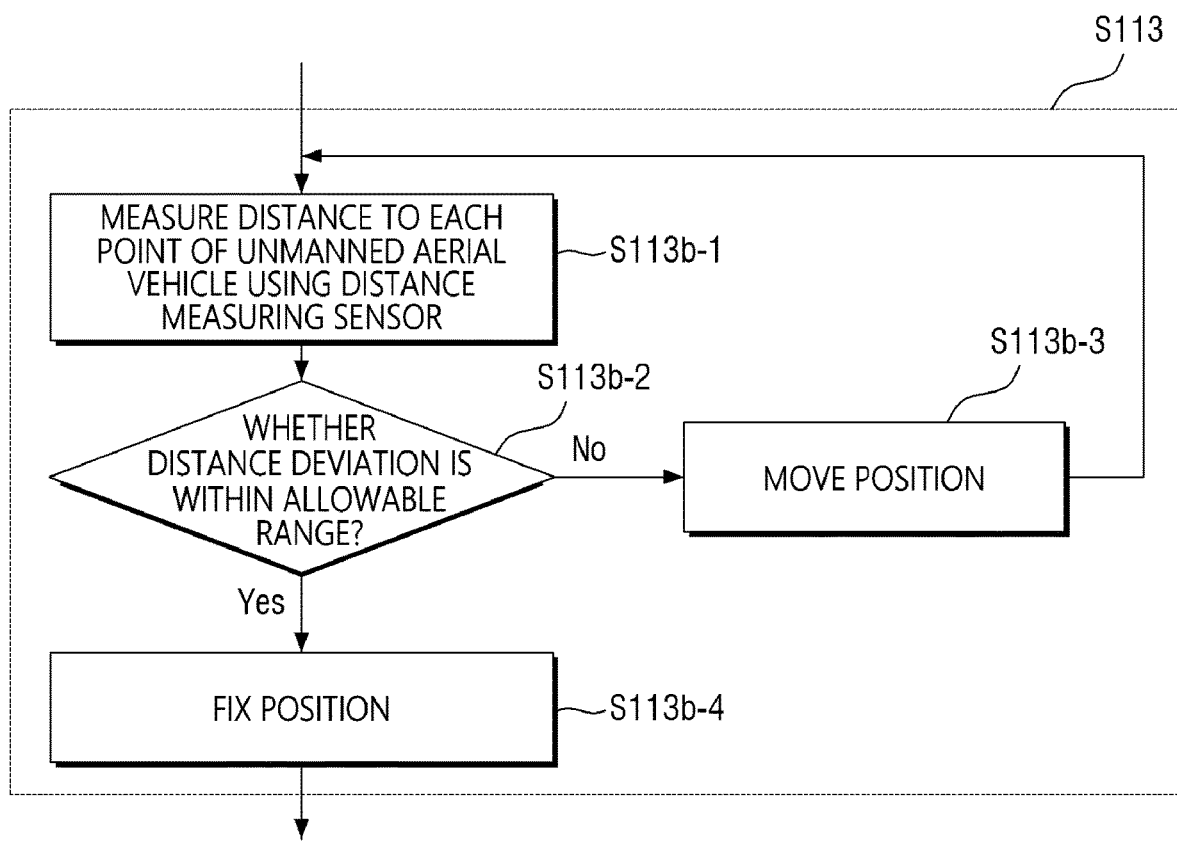
FIG. 12 is a flowchart illustrating a method of adjusting a position using sensing data according to another embodiment of the present disclosure.

FIG. 12 is a flowchart illustrating a method of adjusting a position using sensing data according to another embodiment of the present disclosure.

Figure 13:
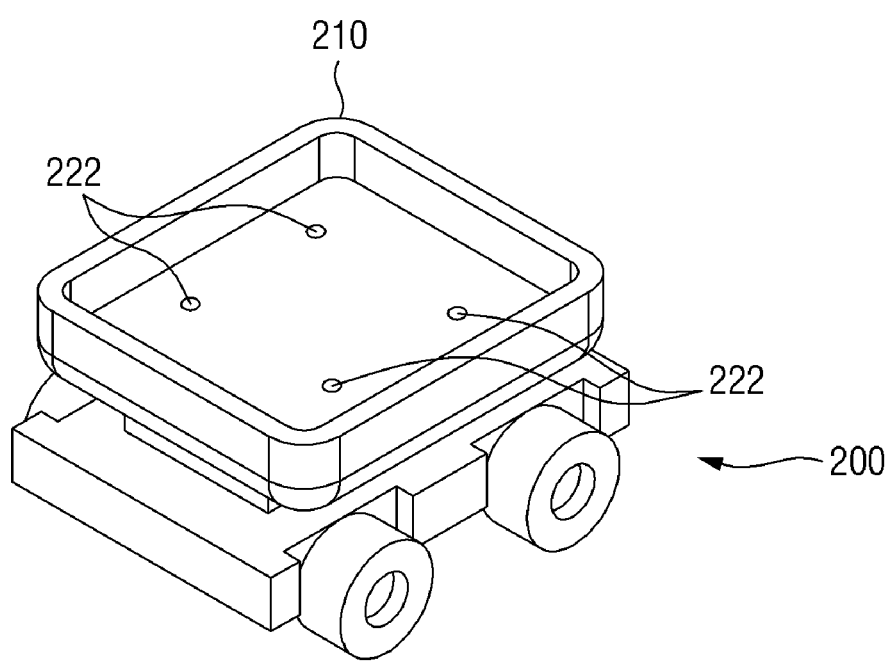
FIG. 13 is a perspective view of an autonomous driving device provided with a distance measuring sensor according to another embodiment of the present disclosure.

FIG. 13 is a perspective view of an autonomous driving device provided with a distance measuring sensor according to another embodiment of the present disclosure.

Figure 14:
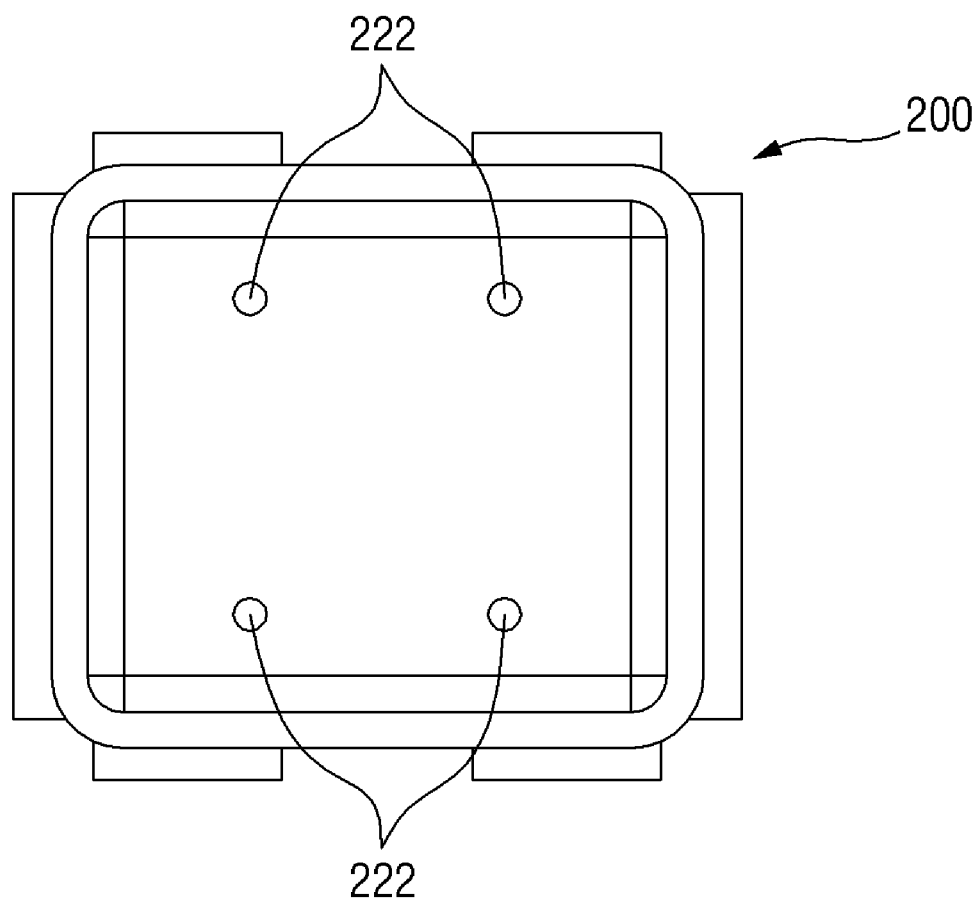
FIG. 14 is a plan view of an autonomous driving device provided with a distance measuring sensor according to another embodiment of the present disclosure.

FIG. 14 is a plan view of an autonomous driving device provided with a distance measuring sensor according to another embodiment of the present disclosure.

Figure 15:
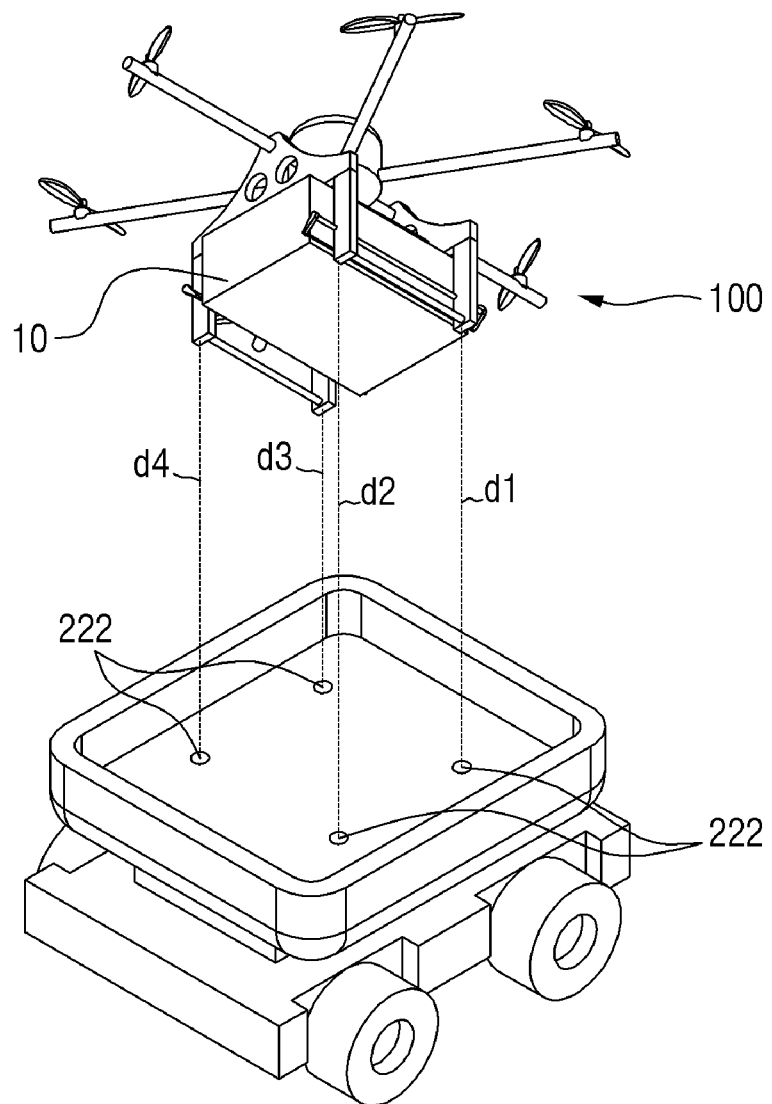
FIG. 15 is a diagram illustrating an autonomous driving device and an unmanned aerial vehicle aligned according to the method of FIG. 12.

FIG. 15 is a diagram illustrating an autonomous driving device and an unmanned aerial vehicle aligned according to the method of FIG. 12.

Referring to FIGS. 12 to 15, when the movement to the position of the unmanned aerial vehicle 100 is completed, the autonomous vehicle 200 may measure the distance to one or more spots located on the unmanned aerial vehicle 100 that is flying in place in the air or landing on the ground (S113b-1). FIGS. 12 to 15 illustrates that one or more spots are located in the landing gear of the unmanned aerial vehicle 100. In an embodiment, one or more distance measuring sensors 222 for measuring a distance to each point located in the landing gear of the unmanned aerial vehicle 100 may be arranged on the upper portion of the autonomous vehicle 200.

As illustrated in FIG. 13, one or more distance measuring sensors 222 may be included in the autonomous vehicle 200 to measure the distances of a plurality of spots located in the landing gear. FIGS. 13 and 14 illustrate that four distance measuring sensors 222 are arranged on the upper surface of the goods loading unit 210 in order to measure the distances of four spots of the landing gear of the unmanned aerial vehicle 100. The distance measuring sensor 222 may be an ultrasonic-based distance measuring sensor, an infrared-based distance measuring sensor, or the like. As another embodiment, one distance measuring sensor (e.g., lidar, ToF sensor) capable of measuring the distance to four spots of the landing gear in three dimensions may be adopted in this embodiment.

Next, the autonomous vehicle 200 may identify the measured distance to each point of the landing gear, and calculates a deviation of each distance. Subsequently, the autonomous vehicle 200 may determine whether all deviations of the respective distances fall within an allowable range (S113b-2). Subsequently, when the deviation of each distance deviates from the allowable range, the autonomous vehicle 200 may move so that the relative position with the unmanned aerial vehicle 100 is adjusted (S113b-3). In this case, the autonomous vehicle 200 may adjust its position so that it moves in the direction of the point having the greatest deviation or in the opposite direction. In addition, the autonomous vehicle 200 may measure the distance from the moved position to each point located in the landing gear of the unmanned aerial vehicle 100 again.

On the other hand, if the deviation of each distance is within the allowable range, the autonomous vehicle 200 may determine that the position adjustment is completed, and may fix the current position as the position to take over the goods 10 (S113b-4). As illustrated in FIG. 15, when the separation distances d1, d2, d3, and d4 between the distance measuring sensor 222 and the corresponding landing gear point show a deviation within the allowable range, the position adjustment for unloading the goods may be completed.

In the above description, it has been described that the distance measured by the autonomous vehicle 200 is the landing gear, but the present disclosure is not limited to this embodiment. For example, the autonomous vehicle 200 may measure the distance to another point of the unmanned aerial vehicle 100 other than the landing gear, and adjust the relative position with the unmanned aerial vehicle 100 based on the deviation of the measured distance. In addition, in the above-described embodiment, it has been described that the distances to four spots are measured, but the present disclosure is not limited thereto. For example, the autonomous vehicle 200 may measure distances to two or more spots formed on the unmanned aerial vehicle 100 and perform position adjustment based on deviations of the two or more measured distances.

According to the present embodiment, based on the distance between the autonomous vehicle 200 and a specific point of the unmanned aerial vehicle 100, it is possible to accurately perform the position adjustment of the autonomous vehicle 200 for unloading goods.

Figure 16:
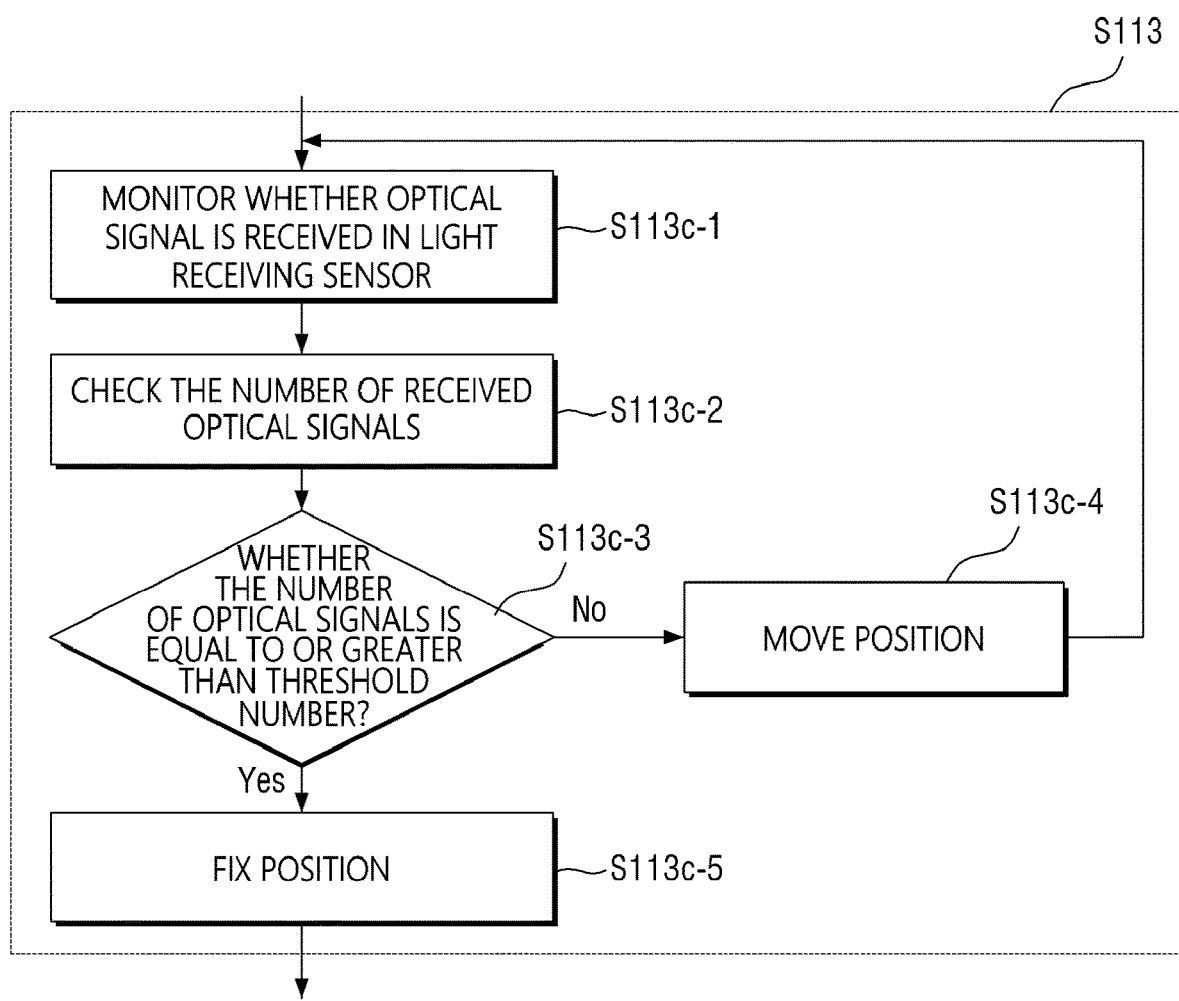
FIG. 16 is a flowchart illustrating a method of adjusting a position using sensing data according to another embodiment of the present disclosure.

FIG. 16 is a flowchart illustrating a method of adjusting a position using sensing data according to another embodiment of the present disclosure.

Figure 17:
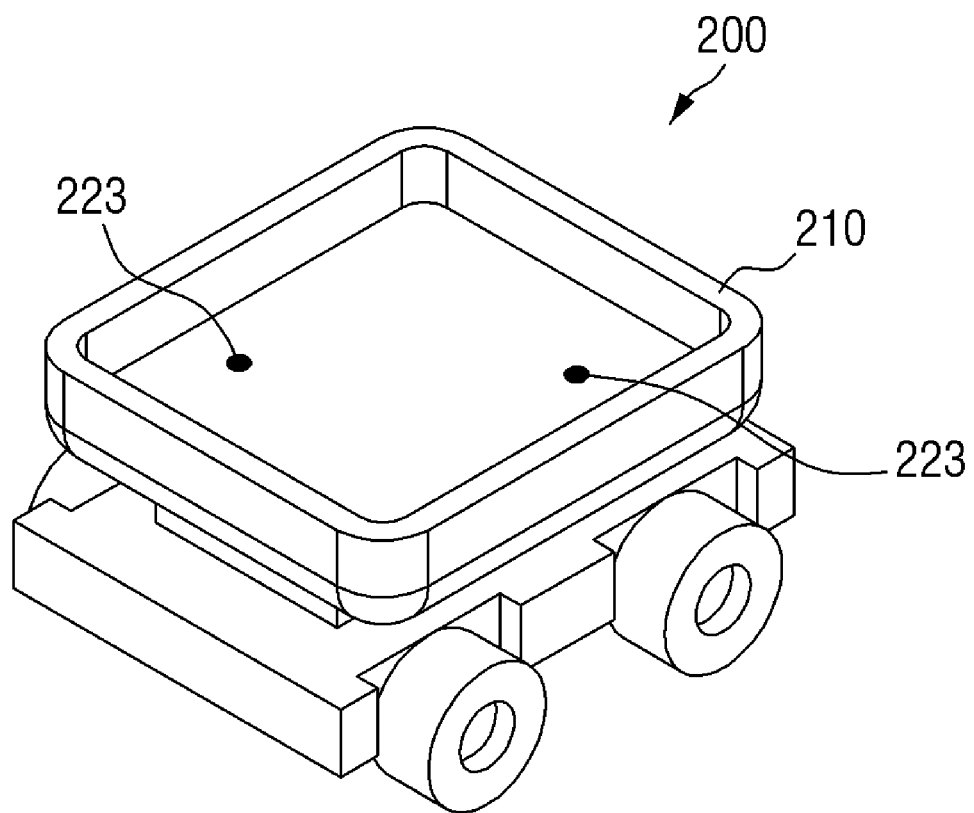
FIG. 17 is a perspective view of an autonomous driving device provided with a light receiving sensor according to another embodiment of the present disclosure.

FIG. 17 is a perspective view of an autonomous driving device provided with a light receiving sensor according to another embodiment of the present disclosure.

Figure 18:
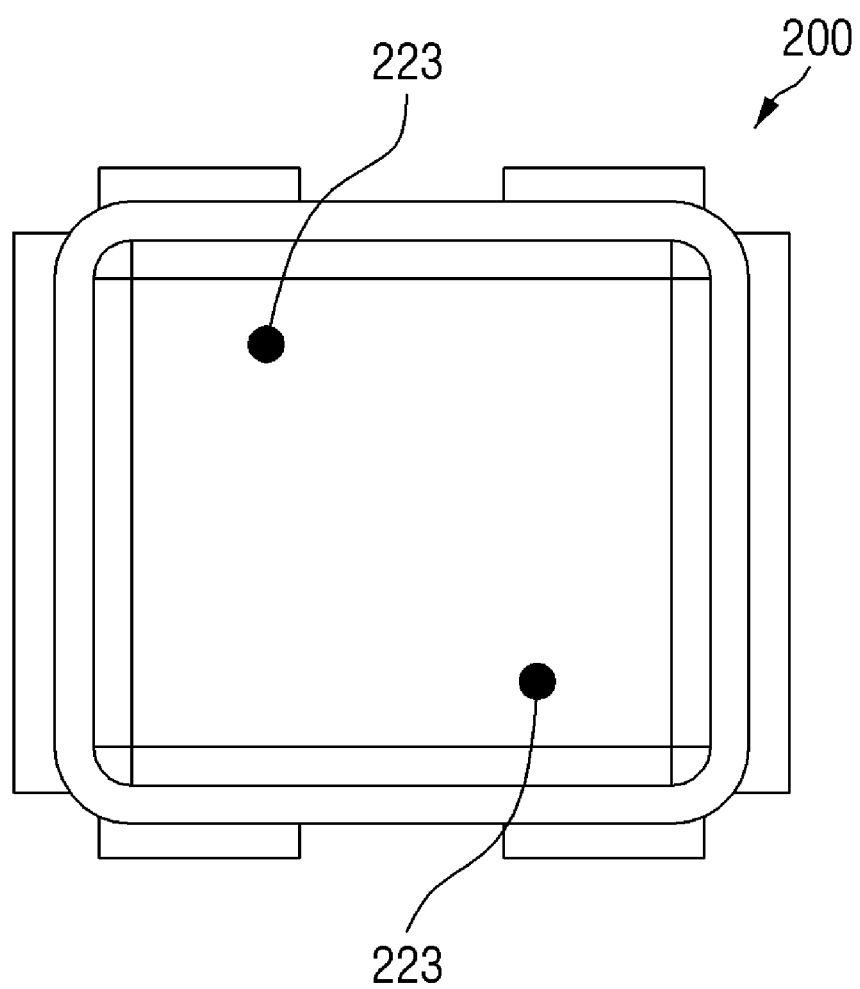
FIG. 18 is a plan view of an autonomous driving device provided with a light receiving sensor according to another embodiment of the present disclosure.

FIG. 18 is a plan view of an autonomous driving device provided with a light receiving sensor according to another embodiment of the present disclosure.

Figure 19:
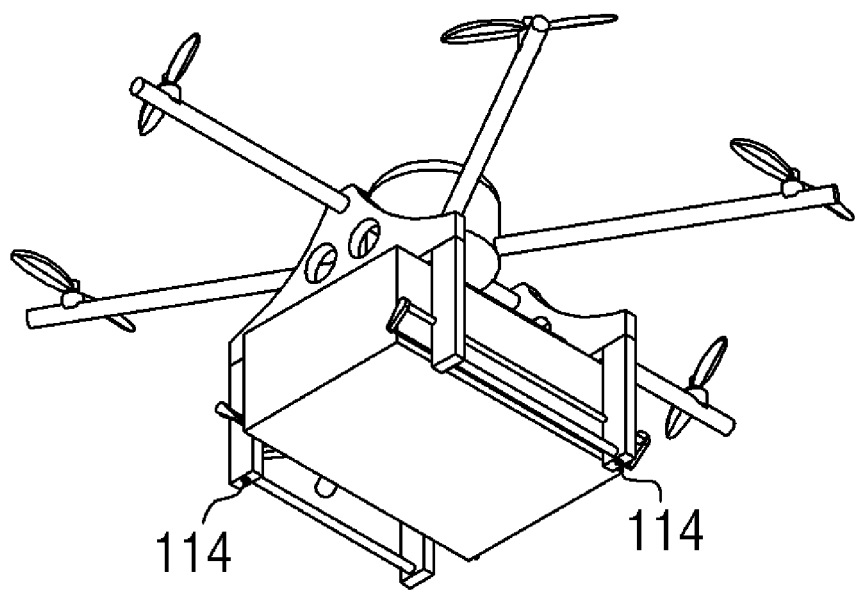
FIG. 19 is a view showing an unmanned aerial vehicle referenced in another embodiment of the present disclosure.

FIG. 19 is a view showing an unmanned aerial vehicle referenced in another embodiment of the present disclosure.

Figure 20:
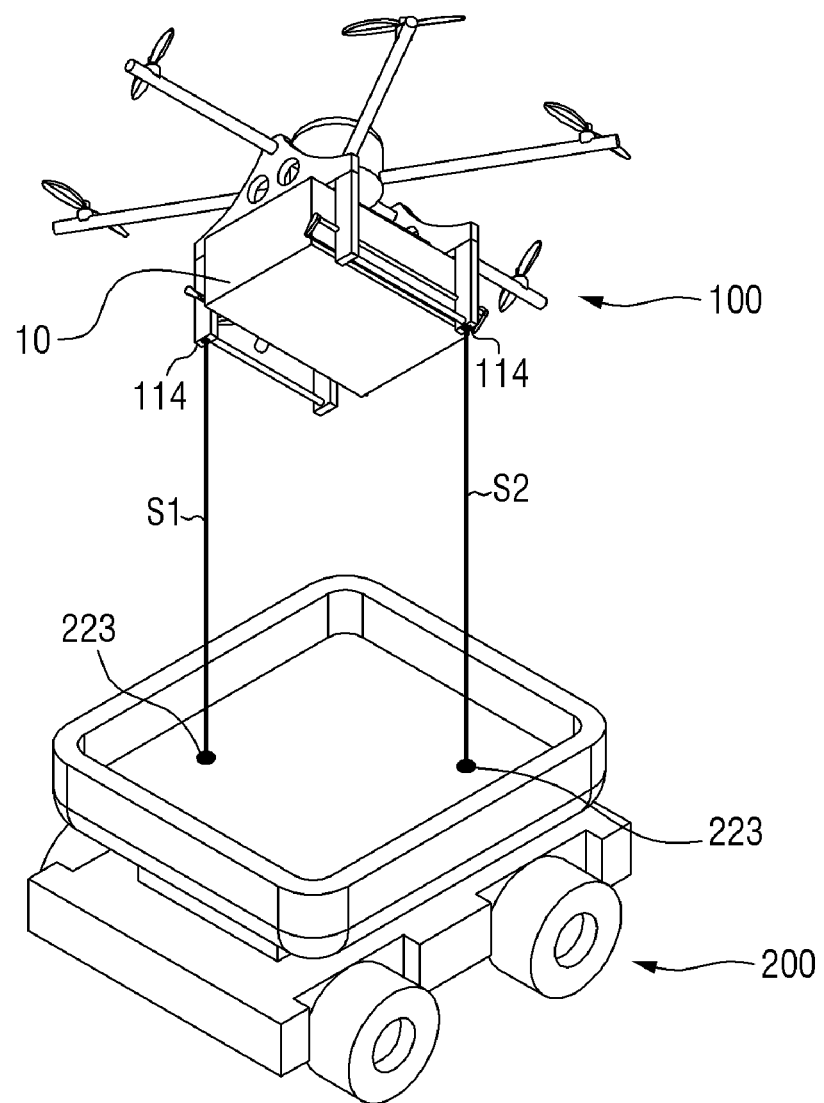
FIG. 20 is a diagram illustrating an autonomous driving device and an unmanned aerial vehicle aligned according to the method of FIG. 16.

FIG. 20 is a diagram illustrating an autonomous driving device and an unmanned aerial vehicle aligned according to the method of FIG. 16.

Referring to FIGS. 16 to 20, when the movement to the position of the unmanned aerial vehicle 100 is completed, the autonomous vehicle 200 may monitor whether one or more optical signals emitted from the unmanned aerial vehicle 100 flying in place in the air or landing on the ground are received (S113c-1).

The unmanned aerial vehicle 100 may include one or more light emitting units 114 for emitting a straight optical signal as illustrated in FIG. 19. In this embodiment, the light emitting unit 114 is exemplified as being arranged on the lower surface of the landing gear, but the present disclosure is not limited thereto, and the light emitting unit may be located at another position of the unmanned aerial vehicle 100 capable of emitting an optical signal in a downward direction. The light emitting unit 114 may include an infrared light emitting device, a laser light emitting device, and the like.

In addition, as illustrated in FIGS. 17 and 18, a light receiving sensor 223 may be mounted on the upper surface of the autonomous vehicle 200 in correspondence with the position of the light emitting unit 114. It may be determined whether the optical signal emitted from the light emitting unit 114 is received using the light receiving sensor 223.

Next, the autonomous vehicle 200 may identify the number of optical signals received from the light emitting unit 114 of the unmanned aerial vehicle 100 (S113c-2). In this case, the autonomous vehicle 200 may identify the number of the light receiving sensors 223 that receive the optical signal, thereby confirming the number of the received optical signals. Next, the autonomous vehicle 200 may determine whether the number of received optical signals is less than a preset threshold number (S113c-3), and if the number of received optical signals is less than the threshold number, it may move so that the relative position with the unmanned aerial vehicle 100 is adjusted (S113c-4). In this case, the autonomous vehicle 200 may adjust its position so that the autonomous vehicle 200 can rotate with the position of the light receiving sensor 223 receiving the optical signal as a central axis.

On the other hand, when the number of received optical signals is equal to or greater than the threshold number, the autonomous vehicle 200 may fix the current position as a position to take over the goods 10 (S113c-5). As illustrated in FIG. 20, when the optical signals 51 and S2 emitted from each light emitting unit 114 are received by the light receiving sensor 223 in a threshold number or more, the position adjustment for unloading goods may completed.

In the above description, it has been described that two optical signals are received, but the present disclosure is not limited thereto. For example, the unmanned aerial vehicle 100 may emit three or more optical signals, and the autonomous vehicle 200 may perform position adjustment according to whether the three or more optical signals are received. As another example, the unmanned aerial vehicle 100 may emit one optical signal, and in this case, the autonomous vehicle 200 may perform position adjustment according to whether the one optical signal is received. In this case, the one optical signal may be a signal transmitted in a downward direction from the center point of the unmanned aerial vehicle 100, and one light receiving sensor 223 may be mounted on the autonomous vehicle 200 at a position corresponding to the center point.

According to the present embodiment, based on whether or not the optical signal emitted from the unmanned aerial vehicle 100 is received, the position adjustment of the autonomous driving vehicle 200 for unloading goods may be accurately completed.

On the other hand, the autonomous vehicle 200 may perform position alignment for unloading goods while the unmanned aerial vehicle 100 is landing. In this case, the landing gears 115a to 115d having a length exceeding the height of the autonomous vehicle 200 may be provided in the unmanned aerial vehicle 100 so that the autonomous vehicle 200 can move under the landing unmanned aerial vehicle 100.

FIG. 21 is a diagram illustrating an unmanned aerial vehicle that may be referred to in some embodiments of the present disclosure.

FIG. 22 is a diagram illustrating a position adjustment state of an autonomous vehicle, which may be referred to in some embodiments of the present disclosure.

Referring to FIGS. 21 and 22, the unmanned aerial vehicle 100 may have a plurality of landing gears 115a to 115d forming a height and width, through which the autonomous vehicle 200 can pass thereunder in a state, in which the unmanned aerial vehicle 100 lands on the ground or a platform having a predetermined height. In the above embodiments, the gripping members 112 and 113 also serve as landing gears, but in this embodiment, separate landing gears 115a to 115d are included in the unmanned aerial vehicle 100. The landing gears 115a to 115d may extend outwardly at a predetermined angle. The length of the landing gears 115a to 115d exceeds the height of the autonomous vehicle 200. When the unmanned aerial vehicle 100 is landed, a space, through which the autonomous vehicle 200 can pass, may be formed between the goods 10 gripped by the unmanned aerial vehicle 100 and the ground.

As shown in FIG. 22, distance measuring sensors 224a to 224d may be arranged at each corner of the autonomous vehicle 200. The distance measuring sensors 224a to 224d may measure a distance to the landing gears 115a to 115d in a horizontal direction. In this embodiment, the distances of the landing gears 115a to 115d in the horizontal direction are measured. That is, the first distance measuring sensor 224*a* may measure the distance to the first landing gear 115*a*, the second distance measuring sensor 224*b* may measure the distance to the second landing gear 115*b*, the third distance measuring sensor 224*c* may measure the distance to the third landing gear 115*c*, and the fourth distance measuring sensor 224*d* may measure the distance to the fourth landing gear 115*d*.

After the autonomous vehicle 200 moves to the position under the unmanned aerial vehicle 100 based on the approach movement route, it may measure the distance to the landing gears 115*a* to 115*d* using the distance measuring sensors 224*a* to 224*d*. The autonomous vehicle 200 may identify the distance to each point of the landing gear, and adjust the relative position with the unmanned aerial vehicle 100 when the deviation of the distance, which is a result of calculating the deviation of each distance, deviates outside the allowable range. In addition, the autonomous vehicle 200 may complete the position adjustment when the distance deviation is within the allowable range.

As another embodiment, a light receiving sensor may be arranged at one or more corners of the autonomous vehicle 200, and a light emitting unit may be provided at a position corresponding to the position of the light receiving sensor among the landing gears 115*a* to 115*d* of the autonomous vehicle 200 of FIG. 22. That is, the light emitting unit may be arranged in the inner side portion of the landing gears 115*a* to 115*d*, and the position of the light emitting unit may correspond to the position of the light receiving sensor. In this way, when one or more light receiving sensors are provided in the corner, the autonomous vehicle 200 moves to the position under the unmanned aerial vehicle 100 based on the approach movement route, and then identifies the optical signal received through the one or more light receiving sensors. And, based on the number of received optical signals, the relative position with the unmanned aerial vehicle 100 may be continuously adjusted or the position adjustment may be completed.

According to the present embodiment, since the position alignment is performed while the unmanned aerial vehicle 100 is in a landed state, so that the position alignment can be performed more stably and the goods can be safely taken over.

Figure 23:
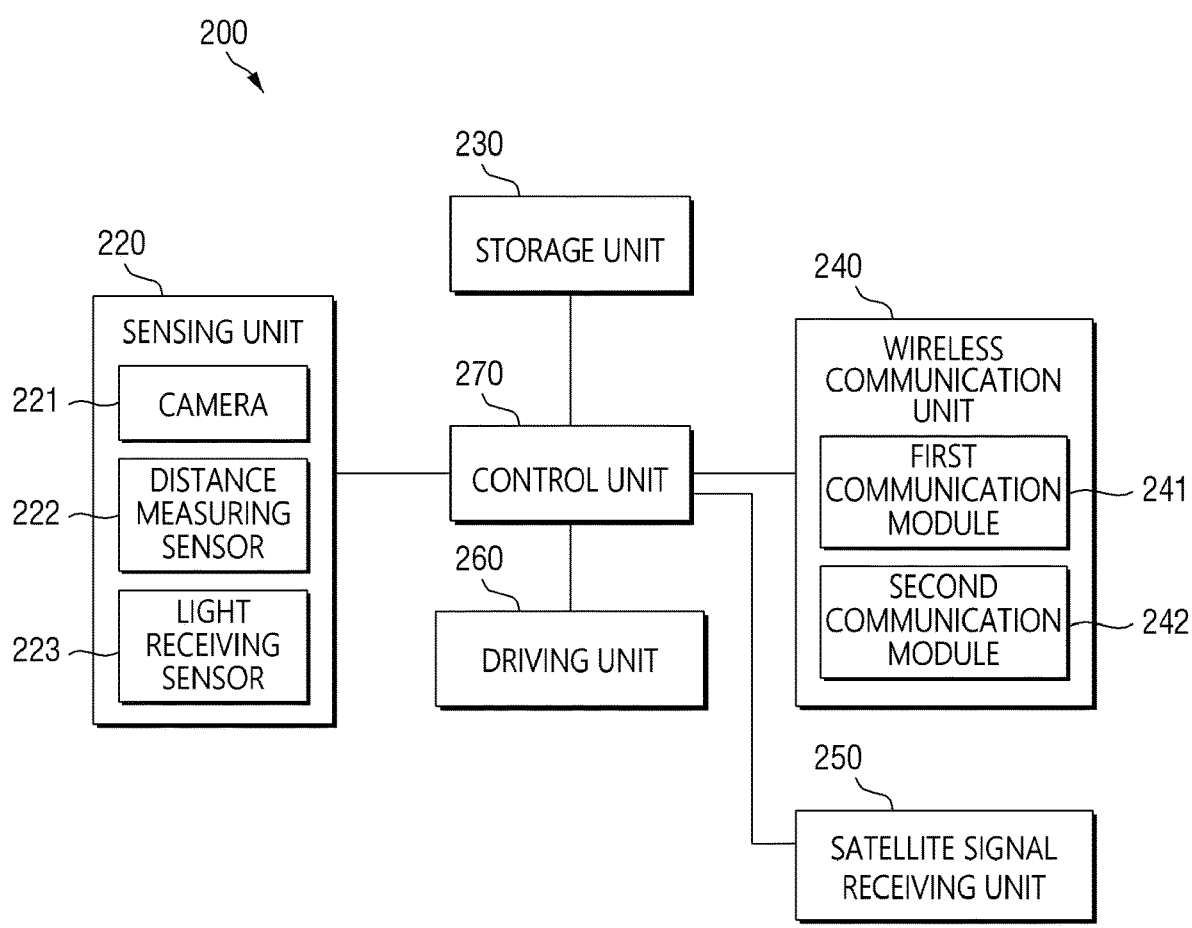
FIG. 23 is a block diagram of an autonomous vehicle according to another embodiment of the present disclosure.

FIG. 23 is a block diagram of an autonomous driving device according to another embodiment of the present disclosure.

As shown in FIG. 23, the autonomous vehicle 200 may include a sensing unit 220, a storage unit 230, a wireless communication unit 240, a satellite signal receiving unit 250, a driving unit 260 and a control unit 270, and these components may be implemented as hardware or software, or may be implemented through a combination of hardware and software.

The storage unit 230 is a storage means such as a memory and a disk device, and stores various data required for the operation of the autonomous vehicle 200. The storage unit 230 may store an approach movement route for moving to the position of the unmanned aerial vehicle 100.

The wireless communication unit 240 may perform wireless communication with each of the unmanned aerial vehicle 100 and the control server 400. The wireless communication unit 240 may include a first communication module 241 and a second communication module 242 that perform wireless communication through different protocols.

The first communication module 241 may communicate with the control server 400 and the like using a mobile communication network included in the network 300.

The second communication module 242 may perform wireless communication with the unmanned aerial vehicle 100 using short-range wireless communication. As the short-range wireless communication, protocols such as Wi-Fi, Zigbee, and Bluetooth may be used.

The satellite signal receiving unit 250 may receive a plurality of satellite signals (aka, GPS signals) used for GNSS-based position measurement.

The driving unit 260 includes moving means such as legs and wheels, and moves the autonomous vehicle 200 to a designated position or direction. The driving speed and direction of the driving unit 260 may be controlled according to the control of the control unit 270. The driving unit 260 may be controlled to be in a stopped state without being driven when the autonomous vehicle 200 moves to a target point.

The sensing unit 220 performs a function of obtaining sensor data indicating a relative position between the unmanned aerial vehicle 100 and the autonomous vehicle 200. The sensing unit 220 may include at least one of a camera 221, a distance measuring sensor 222, and a light receiving sensor 223.

The camera 221 may capture the lower surface of the unmanned aerial vehicle 100 loading the goods 10. The captured image may include a marker 11.

The distance measuring sensor 222 may measure a distance from a specific point (e.g., a lower surface of a landing gear) of the unmanned aerial vehicle 100. The distance measuring sensor 222 may be plural or may be singular. The distance measuring sensor 222 may include an infrared-based sensor, an ultrasonic-based sensor, a lidar, a Time of Flight (ToF), and the like.

The light receiving sensor 223 may receive an optical signal emitted from the unmanned aerial vehicle 100. The light receiving sensor 223 may be singular or plural.

The control unit 270 is a control means such as a microprocessor, and may control various components included in the autonomous vehicle 200. The control unit 270 may receive delivery information from the control server 400 using the first communication module 241 and store it in the storage unit 230. The control unit 270 may identify an unloading position in the delivery information and control the driving unit 260 to move to the unloading position. The control unit 270 may control the driving unit 260 so that the autonomous vehicle 200 can move to a delivery destination. That is, the control unit 270 may control the driving unit 260 so that the autonomous vehicle 200 autonomously drives to the delivery destination after taking over the goods from the unmanned aerial vehicle 100 at the unloading position.

When the movement to the unloading position is completed, the control unit 270 may recognize the unmanned aerial vehicle 100 for taking over the goods 10 in the vicinity of the unloading position. In an embodiment, the control unit 270 may receive in advance identification information of the unmanned aerial vehicle 100 for unloading goods from the control server 400 using the first communication module 241 and store it in the storage unit 230. If the identification information received through the second communication module 242 matches the identification information stored in the storage unit 230, it may determine that the unmanned aerial vehicle 100 for taking over the goods 10 is recognized. As another embodiment, the control unit 270 may capture the surroundings using the camera 221, and analyze the captured image to recognize the unmanned aerial vehicle 100 existing in the vicinity.

The control unit 270 may form a short-range wireless session with the recognized unmanned aerial vehicle 100 using the second communication module 242 to receive various data necessary for goods delivery and unloading from the unmanned aerial vehicle 100. In one embodiment, the control unit 270 may generate an approach movement route for moving from the position of the autonomous vehicle 200 to the position of the unmanned aerial vehicle 100 based on the data received from the unmanned aerial vehicle 100 and store it in the storage unit 230.

When the autonomous vehicle 200 is moved to the position of the unmanned aerial vehicle 100, the control unit 270 may obtain sensor data using the sensing unit 220, and adjust the relative position with the unmanned aerial vehicle 100 based on the obtained sensor data. In one embodiment, the control unit 270 may obtain an image including the marker 11 using the camera 221 as in the method according to FIG. 7, and adjust the relative position of the unmanned aerial vehicle 100 and the autonomous vehicle 200 based on the image. In another embodiment, the control unit 270 may measure the distance between the autonomous vehicle 200 and a specific point of the unmanned aerial vehicle 100 using the distance measuring sensor 222 as in the method according to FIG. 12, and adjust the relative positions of the unmanned aerial vehicle 100 and the autonomous vehicle 200 based on the measured distance. In another embodiment, the control unit 270 may detect an optical signal emitted from the unmanned aerial vehicle 100 by using the light receiving sensor 223 as in the method according to FIG. 16, and adjust the relative positions of the unmanned aerial vehicle 100 and the autonomous vehicle 200 based on the detected optical signal.

When the position adjustment is completed, the control unit 270 may transmit an unloading request signal to the unmanned aerial vehicle 100 using the second communication module 242 to take over the goods from the unmanned aerial vehicle 100.

The methods according to the embodiments of the present disclosure described so far may be performed by executing a computer program implemented as computer readable code. The computer program may be transmitted from the first computing device to the second computing device through a network such as the Internet and installed in the second computing device, thereby being used in the second computing device. The first computing device and the second computing device include all of a server device, a physical server belonging to a server pool for a cloud service, and a stationary computing device such as a desktop PC.

The computer program may be stored in a recording medium such as a DVD-ROM or a flash memory device.

Meanwhile, the autonomous vehicle 200 may include various goods protecting means in order to stably take over the goods received from the unmanned aerial vehicle 100.

After the above-described position adjustment is completed, the autonomous vehicle 200 to be described later may take over the goods from the unmanned aerial vehicle 100 by using the goods protecting means.

Hereinafter, various embodiments of an autonomous driving device including a goods protecting means will be described with reference to FIGS. 24 to 29.

Figure 24:
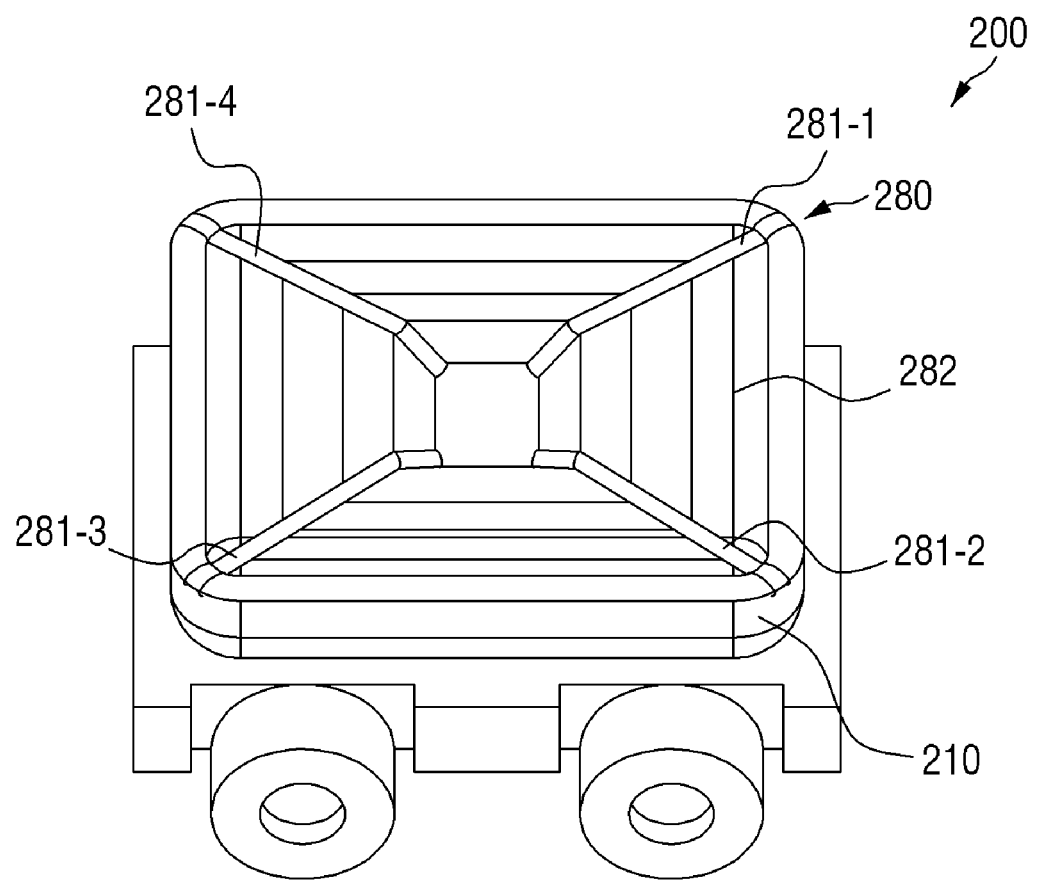
FIGS. 24 and 25 are views illustrating an autonomous driving device including a folding pole as a goods protecting means according to another embodiment of the present disclosure.
Figure 25:
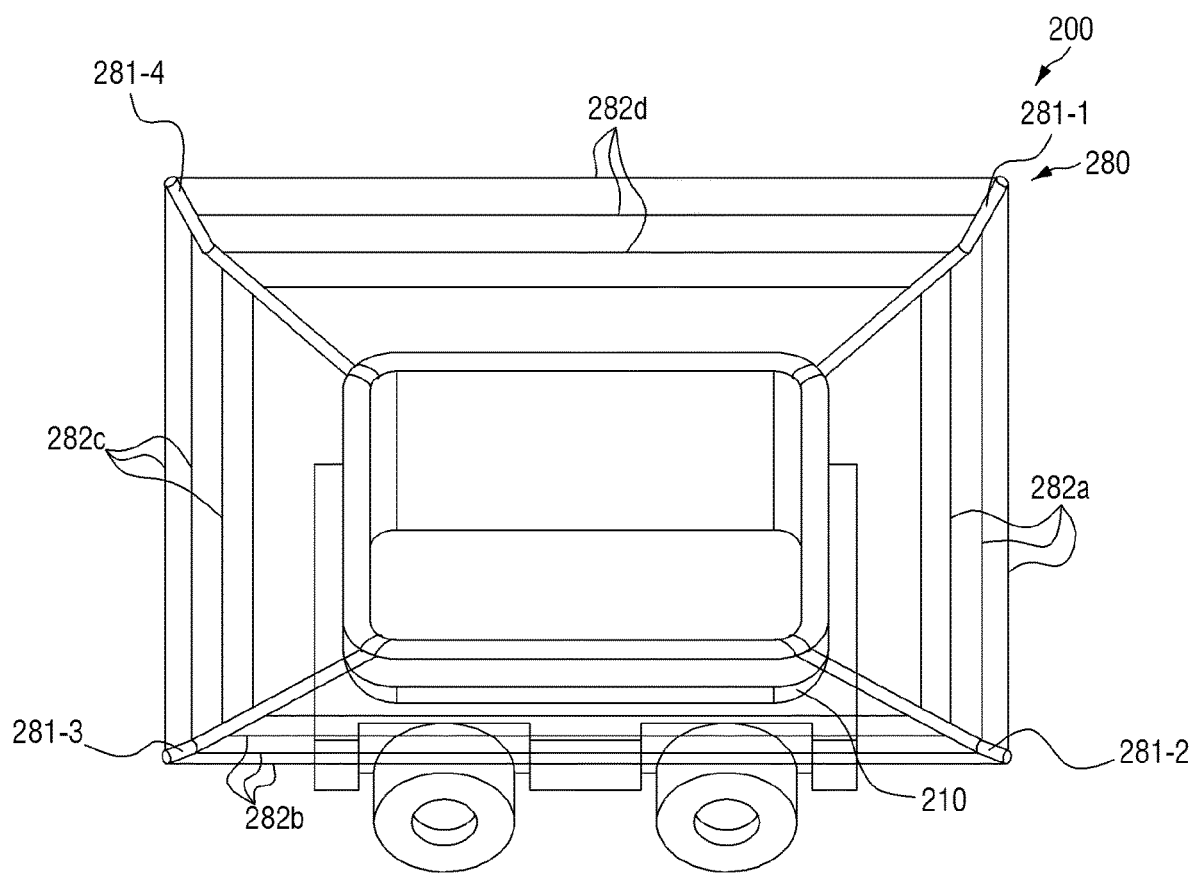

FIGS. 24 and 25 are views illustrating an autonomous driving device including a folding pole as a goods protecting means according to another embodiment of the present disclosure.

Referring to FIGS. 24 and 25, the autonomous vehicle 200 may include a goods protecting unit 280 coupled to the goods loading unit 210, and the goods protecting unit 280 includes a plurality of folding poles 281-1, 281-2, 281-3, 281-4.

The folding poles 281-1, 281-2, 281-3, 281-4 may be folded inward of the goods loading unit 210 as shown in FIG. 24, and also may be unfolded outward of the goods loading unit 210 as shown in FIG. 25. The folding poles 281-1, 281-2, 281-3, and 281-4 may be folded inwardly or unfolded outwardly according to the control of the control unit 270. In addition, a net 282 may be connected between adjacent folding poles among the plurality of folding poles 281-1, 281-2, 281-3, and 281-4. That is, a net 282a may be connected between the first folding pole 281-1 and the second folding pole 281-2, and a net 282b may be connected between the second folding pole 281-2 and the third folding pole 281-3. In addition, a net 282c is connected between the third folding pole 281-3 and the fourth folding pole 281-4. A net 282d is connected between the fourth folding pole 281-4 and the first folding pole 281-1.

The plurality of folding poles 281-1, 281-2, 281-3, 281-4 are unfolded from the inside to the outside when unloading the goods to prevent the goods from being separated from the autonomous vehicle 200 and protect goods from impact as well. When the position adjustment is completed, the control unit 270 unfolds the folding poles 281-1, 281-2, 281-3, and 281-4, and then transmits an unloading request signal to the unmanned aerial vehicle 100 to take over the goods from the unmanned aerial vehicle 100.

According to the present embodiment, by taking over the goods using a plurality of folding poles 281-1, 281-2, 281-3, 281-4 connected to the net, it can have the effect of preventing the goods from being separated from the autonomous vehicle 200 and protecting the goods from the impact that occurs during unloading.

Figure 26:
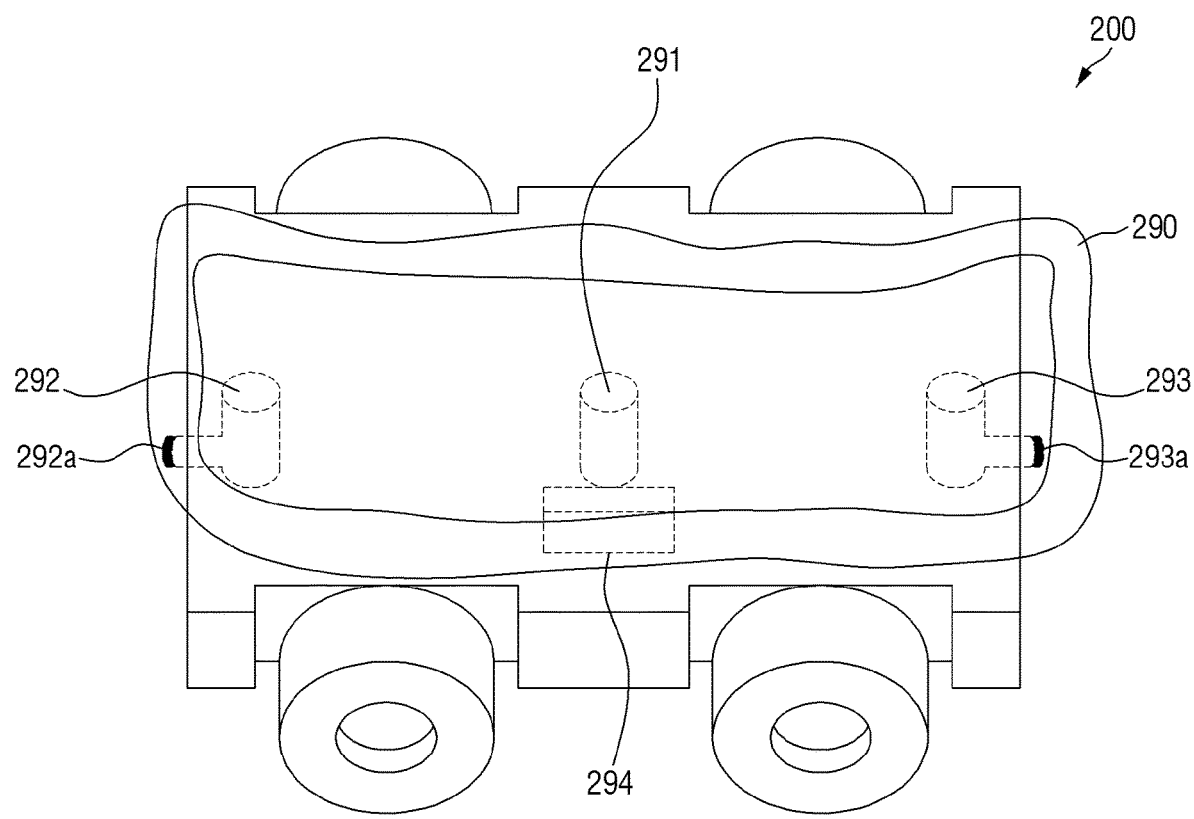
FIGS. 26 and 27 are views illustrating an autonomous driving device having an air mat as a goods protecting means according to another embodiment of the present disclosure.
Figure 27:
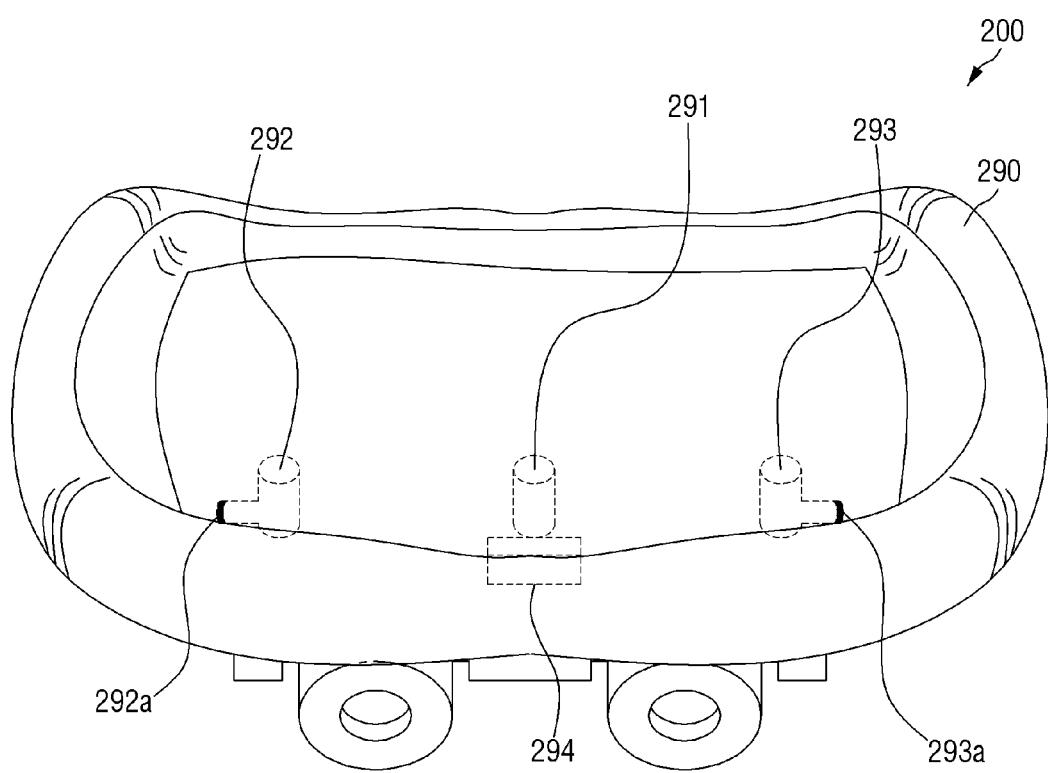

FIGS. 26 and 27 are views illustrating an autonomous driving device having an air mat as a goods protecting means according to another embodiment of the present disclosure.

Referring to FIGS. 26 and 27, the autonomous vehicle 200 may include an air mat 290 coupled to the upper surface of the goods loading unit 210, a pump 294 for injecting air into the air mat 290, an injection pipe 291 connecting the pump 294 and the air mat 290, and one or more exhaust pipes 292 and 293 for discharging the air from inside the air mat 290 to the outside.

If air is not injected into the air mat 290, it may be in a non-inflated state as shown in FIG. 26, and when air is injected into the air mat 290, the air mat 290 may be inflated as shown in FIG. 27. Injection pipes 291 and exhaust pipes 292 and 293 may be coupled to a lower portion of the air mat 290. The injection pipes 291 supply the air generated by the pump 294 to the inside of the air mat 290, and the exhaust pipes 292 and 293 discharge the air inside the air mat 290 to the outside.

The exhaust pipes 292 and 293 may be formed near both ends of the air mat 290. When goods fall from the air onto the air mat 290, the exhaust pipes 292 and 293 discharge air proportional to the falling pressure of the goods to the outside so that the goods are not thrown out due to the falling impact. Air outlets 292a and 293a in the form of valves may be formed at the ends of the exhaust pipes 292 and 293. The air outlets 292a and 293a may be in a closed state when goods are not unloaded, and may be in an open state when goods are unloaded.

As shown in FIG. 27, when the air mat 290 is in a fully unfolded state, the area of the air mat 290 covers the area of the goods loading unit 210. The fully unfolded air mat 290 prevents the unloaded goods from being separated from the autonomous vehicle 200. When the position adjustment is completed, the control unit 270 may drive the pump 294 to inject air into the air mat 290, and when the air injection is completed for a preset time, it may transmit an unloading request signal from the unmanned aerial vehicle 100 after changing the air outlets 292a and 293a from the closed state to the open state to take over the goods from the unmanned aerial vehicle 100. When the goods fall on the center point of the air mat 290, air having a size proportional to the falling pressure of the goods is discharged to the outside through the air outlets 292a and 293a. Through the air discharge, the goods are not thrown out to the outside, and the vicinity of the center where the goods fell becomes a relatively hollow shape. When the taking over of the goods is completed, the control unit 270 may prevent the air of the air mat 290 from being discharged to the outside by making the air outlets 292a and 293a to be in the closed state again.

According to the present embodiment, by taking over the goods using the air mat 290, it is possible to prevent the goods from being separated from the autonomous vehicle 200 and to protect the goods from the impact that occurs during unloading.

Figure 28:
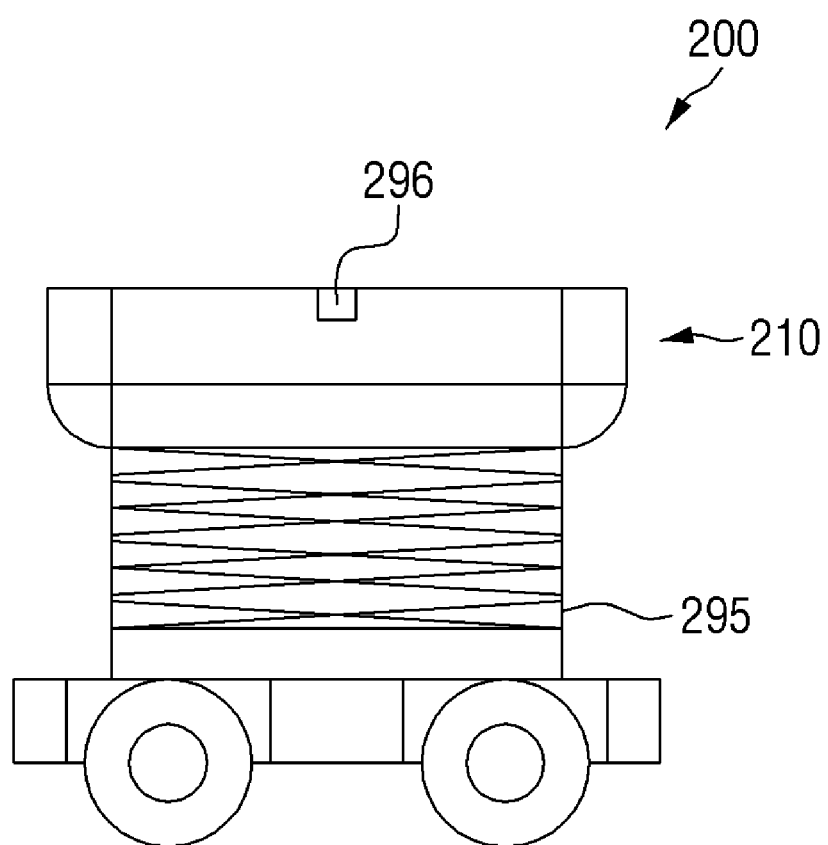
FIGS. 28 and 29 are diagrams illustrating an autonomous driving device having a lifting unit as a goods protecting means according to another embodiment of the present disclosure.
Figure 29:
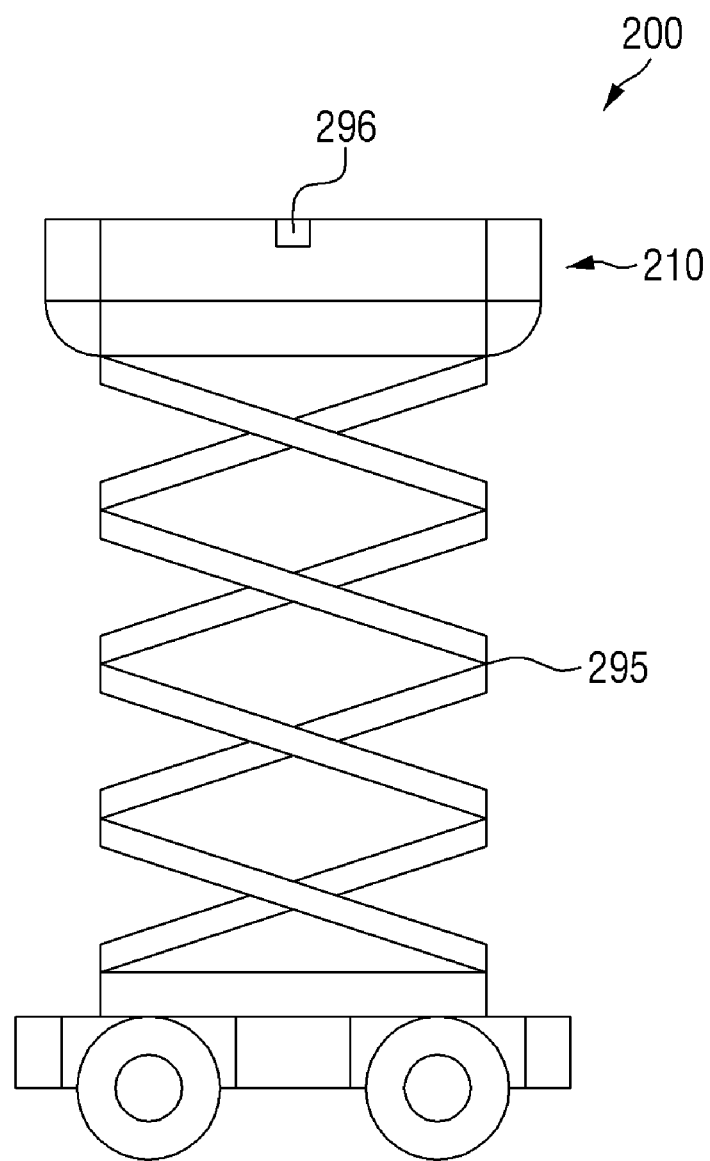

FIGS. 28 and 29 are diagrams illustrating an autonomous driving device having a lifting unit as a goods protecting means according to another embodiment of the present disclosure.

Referring to FIGS. 28 and 29, the autonomous vehicle 200 may include a lifting unit 295 for raising or lowering the goods loading unit 210.

FIG. 28 illustrates a state, in which the lifting unit 295 does not rise at all, and FIG. 29 illustrates a state, in which the lifting unit 295 maximally rises.

As illustrated in FIGS. 28 and 29, the lifting unit 295 raises or lowers the goods loading unit 210. As the lifting unit 295 rises, the goods loading unit 210 is also raised together, so that the distance between the goods loaded by the unmanned aerial vehicle 100 and the goods loading unit 210 becomes narrower, so that the goods can be delivered more safely.

Meanwhile, a distance measuring sensor 296 may be arranged on the upper surface of the goods loading unit 210. That is, the autonomous vehicle 200 may include a distance measuring sensor 296 for measuring a distance to the goods or the unmanned aerial vehicle 100. As another embodiment, when the autonomous vehicle 200 includes the distance measuring sensor 222 as shown in FIGS. 13 to 15, the distance measuring sensor 222 may be used to measure the distance. The lifting unit 295 may raise the goods loading unit 210 under the control of the control unit 270 when the goods are taken over from the unmanned aerial vehicle 100. In addition, the lifting unit 295 continuously raises the goods loading unit 210, but when the distance measured by the distance measuring sensor 296 is included in the unloading range, the raising of the goods loading unit 210 may be stopped under the control of the control unit 270. Specifically, when the position adjustment is completed, the control unit 270 raises the goods loading unit 210 through the raising of the lifting unit 295, but may continuously measure the distance to the unmanned aerial vehicle 100 or the goods using the distance measuring sensor 296. If the measured distance is not included in the unloading range, the control unit 270 continuously raises the lifting unit 295, but if the distance measured using the distance measuring sensor 296 is included in the unloading range, it stops the rise of the lifting unit 295. When the rise of the lifting unit 295 is stopped, the rise of the goods loading unit 210 is also stopped, and in this state, the control unit 270 may transmit the unloading request signal from the unmanned aerial vehicle 100 to take over the goods from the unmanned aerial vehicle 100. When the goods are unloaded into the goods loading unit 210, the control unit 270 lowers the lifting unit 295.

According to this embodiment, after the lifting unit 295 is raised to shorten the distance between the unmanned aerial vehicle 100 and the goods loading unit 210, the goods can be safely taken over from the unmanned aerial vehicle 100.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

In the above description, it is described that all the components constituting the embodiments of the present disclosure are combined or operated as one, but the technical features of the present disclosure are not limited to these embodiments. That is, within the scope of the present disclosure, all of the components may be selectively combined and operated in one or more combinations.

Although the operations are shown in a specific order in the drawings, those skilled in the art will appreciate that many variations and modifications can be made to the embodiments without substantially departing from the principles of the present disclosure. Therefore, the disclosed preferred embodiments of the disclosure are used in a generic and descriptive sense only and not for purposes of limitation. The scope of protection of the present disclosure should be interpreted by the following claims, and all technical ideas within the scope equivalent thereto should be construed as being included in the scope of the technical idea defined by the present disclosure.

What is claimed is:

1. A method for an autonomous vehicle to handle goods in collaboration with an unmanned aerial vehicle comprises,
   by the autonomous vehicle, recognizing an unmanned aerial vehicle loading goods;
   by the autonomous vehicle, measuring distances to a plurality of spots on the recognized unmanned aerial vehicle;
   by the autonomous vehicle, calculating difference between the measured distances;
   by the autonomous vehicle, in response to the calculated difference being out of a threshold, adjusting a relative position with the unmanned aerial vehicle by moving the autonomous vehicle, and in response to the calculated difference being within the threshold, completing position adjustment; and
   by the autonomous vehicle, taking over the goods from the unmanned aerial vehicle when the position adjustment is completed.

2. The method of claim 1, wherein taking over the goods from the unmanned aerial vehicle comprises, transmitting a request for unloading the goods to the unmanned aerial vehicle.

3. The method of claim 1, wherein the autonomous vehicle comprises a goods loading unit provided with a space, in which the goods are seated, and a goods protecting unit coupled to the goods loading unit and including a plurality of folding poles,
    wherein taking over the goods from the unmanned aerial vehicle comprises,
    controlling the plurality of folding poles to unfold outward by the autonomous vehicle when the position adjustment is completed.

4. The method of claim 3, wherein a net is connected between adjacent folding poles among the plurality of folding poles.

5. The method of claim 1, wherein the autonomous vehicle comprises a goods loading unit provided with a space, in which the goods are seated, and an air mat and a pump coupled to an upper portion of the goods loading unit,
    wherein taking over the goods from the unmanned aerial vehicle comprises,
    injecting air into the air mat by driving the pump when the position adjustment is completed; and
    transmitting an unloading request signal to the unmanned aerial vehicle when air injection is completed.

6. The method of claim 5, wherein the autonomous vehicle further comprises one or more air outlets for discharging air from the air mat,
    wherein taking over the goods from the unmanned aerial vehicle comprises,
    transmitting the unloading request signal to the unmanned aerial vehicle after opening the air outlet when the air injection is completed.

7. The method of claim 1, wherein the autonomous vehicle includes a goods loading unit provided with a space, in which the goods are seated, a lifting unit for raising or lowering the goods loading unit, and a distance measuring sensor for measuring a distance to the goods or to the unmanned aerial vehicle,
    wherein taking over the goods from the unmanned aerial vehicle comprises,
    initiating raising the goods loading unit using the lifting unit when the position adjustment is completed, and
    completing raising the goods loading unit when a distance measured by the distance measuring sensor within a predetermined unloading range; and
    transmitting an unloading request signal to the unmanned aerial vehicle after completion of raising the goods loading unit.

8. An autonomous vehicle comprising:
a camera for capturing the lower surface of an unmanned aerial vehicle loading the goods;
a distance measuring sensor for measuring a distance to the goods or to the unmanned aerial vehicle;
a driving unit that includes moving means and moves the autonomous vehicle to a designated position or direction; and
a control unit for recognizing the unmanned aerial vehicle loading goods by analyzing an image captured by the camera, measuring distances to a plurality of spots on the recognized unmanned aerial vehicle, calculating difference between the measured distances,
in response to the calculated difference being out of a threshold, controlling the driving unit to adjust a relative position with the unmanned aerial vehicle by moving the autonomous vehicle, and in response to the calculated difference being within the threshold, controlling the driving unit to complete position adjustment; and
taking over the goods from the unmanned aerial vehicle when the position adjustment is completed.

9. The autonomous vehicle of claim 8, wherein the autonomous vehicle comprises a goods loading unit provided with a space, in which the goods are seated, and a goods protecting unit coupled to the goods loading unit and including a plurality of folding poles,
    wherein the control unit controls the plurality of folding poles to unfold outward by the autonomous vehicle when the position adjustment is completed.

10. The autonomous vehicle of claim 8, wherein the autonomous vehicle comprises a goods loading unit provided with a space, in which the goods are seated, and an air mat and a pump coupled to an upper portion of the goods loading unit,
    wherein the control unit injects air into the air mat by driving the pump when the position adjustment is completed, and transmits an unloading request signal to the unmanned aerial vehicle when air injection is completed.

11. The autonomous vehicle of claim 8, wherein the autonomous vehicle includes a goods loading unit provided with a space, in which the goods are seated, and a lifting unit for raising or lowering the goods loading unit, and,
    wherein the control unit initiates raising the goods loading unit using the lifting unit when the position adjustment is completed, and completes raising the goods loading unit when a distance measured by the distance measuring sensor within a predetermined unloading range, and transmits an unloading request signal to the unmanned aerial vehicle after completion of raising the goods loading unit.

\* \* \* \* \*